US006582819B2

(12) United States Patent
McDaniel et al.

(10) Patent No.: US 6,582,819 B2
(45) Date of Patent: *Jun. 24, 2003

(54) LOW DENSITY COMPOSITE PROPPANT, FILTRATION MEDIA, GRAVEL PACKING MEDIA, AND SPORTS FIELD MEDIA, AND METHODS FOR MAKING AND USING SAME

(75) Inventors: Robert R. McDaniel, Houston, TX (US); Johannes A. Geraedts, Roggel (NL)

(73) Assignee: Borden Chemical, Inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/774,881

(22) Filed: Feb. 1, 2001

(65) Prior Publication Data
US 2002/0048676 A1 Apr. 25, 2002

Related U.S. Application Data

(63) Continuation-in-part of application No. 09/450,588, filed on Nov. 30, 1999, which is a continuation-in-part of application No. PCT/US99/16507, filed on Jul. 22, 1999.
(60) Provisional application No. 60/093,672, filed on Jul. 22, 1998.

(51) Int. Cl.[7] ................................................ B32B 5/16
(52) U.S. Cl. ..................... 428/402; 428/403; 428/404; 428/406; 428/407; 427/221; 427/379; 166/295
(58) Field of Search ............................... 428/402–404, 428/406, 407; 427/214, 221, 379; 166/295

(56) References Cited

U.S. PATENT DOCUMENTS

| | | | |
|---|---|---|---|
| 3,217,801 A | 11/1965 | Fast et al. | 166/280 |
| 3,659,651 A | 5/1972 | Graham | 166/280 |
| 3,888,311 A | 6/1975 | Cooke, Jr. | 166/280 |
| 4,003,873 A | 1/1977 | Smith | 524/6 |
| 4,074,760 A | 2/1978 | Copeland et al. | 166/276 |

(List continued on next page.)

FOREIGN PATENT DOCUMENTS

| | | |
|---|---|---|
| EP | 0308257 | 3/1989 |
| EP | 0735234 | 10/1996 |
| EP | 0590948 | 4/1997 |
| EP | 0771935 | 5/1997 |
| WO | 9927229 | 6/1999 |

OTHER PUBLICATIONS

Allan Rickards, Lewis Lacy, Harold Brannon, Chris Stephenson and Dean Bilden, Need Stress Relief? A New Approach To Reducing Stress Cycling Induced (Sep. 27–30, 1998).

J. Francis Young, Macro–Defect–Free Cement: A Review, Mat. Res. Soc. Symp. Proc. vol. 179 (1991 Materials Research Society).

C.S. Poon, L.E. Wassell and G.W. Groves, High Strength Refractory Aluminous Cement, Trans. J. Br. Ceram. Soc., 86, pp. 58–62 (1987).

(List continued on next page.)

*Primary Examiner*—Leszek Kiliman
(74) *Attorney, Agent, or Firm*—Stevens, Davis, Miller & Miller, LLP

(57) ABSTRACT

Low density composite particles made of a binder and filler material are provided for use in subterranean formations. The filler includes low density filler and optionally other filler. The binder includes a polymer and optionally cement. The particles may be employed as proppants useful to prop open subterranean formation fractures. The particles are also useful for gravel packing in subterranean formations, water filtration and artificial turf for sports fields. Methods of making the composite particles are also disclosed.

53 Claims, 6 Drawing Sheets

U.S. PATENT DOCUMENTS

| | | |
|---|---|---|
| 4,101,474 A | 7/1978 | Copeland et al. ............ 523/131 |
| 4,353,746 A | 10/1982 | Birchall et al. ............. 106/713 |
| 4,353,747 A | 10/1982 | Birchall et al. ............. 106/692 |
| 4,353,748 A | 10/1982 | Birchall et al. ............. 106/692 |
| 4,410,366 A | 10/1983 | Birchall et al. ................ 524/5 |
| 4,426,467 A | 1/1984 | Quist et al. ................. 523/145 |
| 4,443,347 A | 4/1984 | Underdown et al. |
| 4,493,875 A | 1/1985 | Beck et al. .................. 428/403 |
| 4,518,039 A | 5/1985 | Graham et al. |
| 4,522,731 A | 6/1985 | Lunghofer |
| 4,581,253 A | 4/1986 | Evans et al. |
| 4,632,876 A | 12/1986 | Laird et al. ................. 428/404 |
| 4,658,899 A | 4/1987 | Fitzgibbon |
| 4,680,230 A | 7/1987 | Gibb et al. ................. 428/403 |
| 4,694,905 A | 9/1987 | Armbruster |
| 4,717,594 A | 1/1988 | Graham et al. |
| 4,732,920 A | 3/1988 | Graham et al. |
| 4,733,729 A | 3/1988 | Copeland et al. ............ 166/276 |
| 4,785,884 A | 11/1988 | Armbruster ................. 166/280 |
| RE32,812 E | 12/1988 | Lemon et al. ............... 523/145 |
| 4,820,766 A | 4/1989 | Lahalih et al. .............. 524/843 |
| 4,879,181 A | 11/1989 | Fitzgibbon |
| 4,888,240 A | 12/1989 | Graham et al. |
| 4,894,285 A | 1/1990 | Fitzgibbob |
| 4,921,820 A | 5/1990 | Rumpf et al. |
| 4,921,821 A | 5/1990 | Rumpf et al. |
| 4,923,714 A | 5/1990 | Gibb et al. ................. 427/221 |
| 4,960,826 A | 10/1990 | Walisser ..................... 524/494 |
| 4,977,116 A | 12/1990 | Rumpf et al. |
| 5,030,603 A | 7/1991 | Rumpf et al. |
| 5,120,455 A | 6/1992 | Lunghofer |
| 5,147,459 A | 9/1992 | Lynn et al. ................. 106/601 |
| RE34,371 E | 9/1993 | Rumpf et al. ............... 501/128 |
| 5,296,584 A | 3/1994 | Walisser ..................... 528/163 |
| 5,330,005 A | 7/1994 | Card et al. |
| 5,422,183 A | 6/1995 | Sinclair et al. |
| 5,425,994 A | 6/1995 | Harry et al. ................ 428/403 |
| 5,439,055 A | 8/1995 | Card et al. |
| 5,478,391 A | 12/1995 | Babaev et al. .............. 106/725 |
| 5,501,275 A | 3/1996 | Card et al. |
| 5,514,744 A | 5/1996 | Brown ....................... 524/423 |
| 5,531,274 A | 7/1996 | Bievenu, Jr. ................ 166/280 |
| 5,597,784 A | 1/1997 | Sinclair et al. ............... 166/28 |
| 5,639,806 A | 6/1997 | Johnson et al. |
| 5,651,816 A | 7/1997 | Kobayashi et al. |
| 5,733,952 A | 3/1998 | Geoffrey ..................... 523/143 |
| 5,785,751 A | 7/1998 | Bashlykov et al. ......... 106/725 |
| 5,814,146 A | 9/1998 | Maggio et al. ............. 106/802 |
| 5,916,966 A | 6/1999 | Walisser ..................... 524/594 |
| 5,921,317 A | 7/1999 | Dewprashad et al. ....... 166/280 |
| 5,952,440 A | 9/1999 | Walisser et al. ............ 525/504 |
| 6,059,034 A | 5/2000 | Rickards et al. ............ 166/280 |
| 6,330,916 B1 | 12/2001 | Rickards et al. ............ 166/280 |
| 6,364,018 B1 | 4/2002 | Brannon et al. ............ 166/280 |
| 6,406,789 B1 | 6/2002 | McDaniel et al. .......... 428/402 |

OTHER PUBLICATIONS

Masaki Hasegawa, Tadashi Kobayashi, G.K. Dinilprem Pushpalal, A New Class Of High Strength, Water And Heat Resistant Polymer–Cement Composite Solidified By An Essentially Anhydrous Phenol Resin Precursor, Cement and Concrete Research, vol. 25, No. 6, pp. 1191–1198 (1995).

K. Kendall, A.J. Howard and J.D. Birchall, F.R.S., The Relation Between Porosity, Microstructure And Strength, And The Approach To Advanced Cement–Based Materials, Phil. Trans. R. Soc. Lond. A3, pp. 139–153 (1983).

LOW DENSITY COMPOSITE PROPPANT, FILTRATION MEDIA, GRAVEL PACKING MEDIA, AND SPORTS FIELD MEDIA, AND METHODS FOR MAKING AND USING SAME

The present application is a continuation-in-part of U.S. patent application Ser. No. 09/450,588, filed Nov. 30, 1999, which is a continuation-in-part of Patent Cooperation Treaty application No. PCT/US99/16507, filed Jul. 22, 1999 (which entered the U.S. National Stage as U.S. patent application Ser. No. 09/486,144 having a 35 USC §371 (c)1, (2), (4) date of May 22, 2000 and is now U.S. Pat. No. 6,406,789), which claims priority from U.S. provisional patent application no. 60/093,672, filed Jul. 22, 1998, all of which are incorporated herein by reference.

BACKGROUND OF THE INVENTION

1. Field of the Invention

The present invention relates to low density composite media to be used in filtration and composite proppant to be used in petroleum and gas production to "support/prop" a hydraulic fracture in the vicinity of a wellbore. The proppant keeps the hydraulic fracture open for the inflow of petroleum and/or natural gas, and can substantially improve the yield per well. More particularly, the invention relates to a particle suitable as composite proppants, composite filtration media and composite media for cushioning artificial turf for a sports field. The particles are built from suitable fillers bonded together with organic and/or inorganic tri-dimensional crosslinkers/binders. The invention also relates to methods for making and using these filtration media, proppants and cushioning media.

2. Description of Background Art

In general, proppants are extremely useful to keep open fractures imposed by hydraulic fracturing upon a subterranean formation, e.g., an oil or gas bearing strata. Typically, the fracturing is desired in the subterranean formation to increase oil or gas production. Fracturing is caused by injecting a viscous fracturing fluid or a foam at high pressure into the well to form fractures. As the fracture is formed, a particulate material, referred to as a "propping agent" or "proppant" is placed in the formation to maintain the fracture in a propped condition when the injection pressure is released. As the fracture forms, the proppants are carried into the well by suspending them in additional fluid or foam to fill the fracture with a slurry of proppant in the fluid or foam. Upon release of the pressure, the proppants form a pack which serves to hold open the fractures. The goal of using proppants is to increase production of oil and/or gas by providing a highly conductive channel in the formation. Choosing a proppant is critical to the success of well stimulation.

The propped fracture thus provides a highly conductive channel in the formation. The degree of stimulation afforded by the hydraulic fracture treatment is largely dependent upon formation parameters, the fracture's permeability and the fracture's propped width. If the proppant is an uncoated substrate, e.g., sand, and is subjected to high stresses existing in a gas/oil well, the substrate may be crushed to produce fines of crushed proppant. Fines will subsequently reduce conductivity within the proppant pack. However, a resin coating will enhance crush resistance of a coated particle above that of the substrate alone.

Glass beads had been used as propping materials (see U.S. Pat. No. 4,068,718, incorporated herein by reference for the state of the technology). Their disadvantages include the costs of energy and production, as before, and their severe drop in permeability at elevated pressures (above about 35 MPa) because of their excessive crushing at downhole conditions. Thus, it is not currently favored.

Three different types of propping materials, i.e., proppants, are currently employed.

The first type of proppant is a sintered ceramic granulation/particle, usually aluminum oxide, silica, or bauxite, often with clay-like binders or with incorporated hard substances such as silicon carbide (e.g., U.S. Pat. No. 4,977,116 to Rumpf et al, incorporated herein by reference, EP Patents 0 087 852, 0 102 761, or 0 207 668). The ceramic particles have the disadvantage that the sintering must be done at high temperatures, resulting in high energy costs. In addition, expensive raw materials are used. They have relatively high bulk density, and often have properties similar to those of corundum grinding materials, which cause high wear in the pumps and lines used to introduce them into the drill hole.

The second type of proppant is made up of a large group of known propping materials from natural, relatively coarse, sands, the particles of which are roughly spherical, such that they can allow significant flow (English "frac sand") (see U.S. Pat. No. 5,188,175 for the state of the technology).

The third type of proppant includes samples of type one and two that may be coated with a layer of synthetic resin (U.S. Pat. No. 5,420,174 to Deprawshad et al; U.S. Pat. No. 5,218,038 to Johnson et al and U.S. Pat. No. 5,639,806 to Johnson et al (the disclosures of U.S. Pat. Nos. 5,420,174, 5,218,038 and 5,639,806, incorporated herein by reference); EP Patent No. 0 542 397).

Known resins used in resin coated proppants include epoxy, furan, phenolic resins and combinations of these resins. The resins are from about 1 to about 8 percent by weight of the total coated particle. The particulate substrate for resin coated proppants may be sand, ceramics, or other particulate substrate and typically has a particle size in the range of USA Standard Testing screen numbers from about 8 to about 100 (i.e. screen openings of about 0.0937 inch to about 0.0059 inch).

Resin coated proppants come in two types: precured and curable. Precured resin coated proppants comprise a substrate coated with a resin which has been significantly crosslinked. The resin coating of the precured proppants provides crush resistance to the substrate. Since the resin coating is already cured before it is introduced into the well, even under high pressure and temperature conditions, the proppant does not agglomerate. Such precured resin coated proppants are typically held in the well by the stress surrounding them. In some hydraulic fracturing circumstances, the precured proppants in the well would flow back from the fracture, especially during clean up or production in oil and gas wells. Some of the proppant can be transported out of the fractured zones and into the well bore by fluids produced from the well. This transportation is known as flow back.

Flowing back of proppant from the fracture is undesirable and has been controlled to an extent in some instances by the use of a proppant coated with a curable resin which will consolidate and cure underground. Phenolic resin coated proppants have been commercially available for some time and used for this purpose. Thus, resin-coated curable proppants may be employed to "cap" the fractures to prevent such flow back. The resin coating of the curable proppants is not significantly crosslinked or cured before injection into the oil or gas well. Rather, the coating is designed to crosslink under the stress and temperature conditions existing in the well formation. This causes the proppant particles to bond together forming a 3-dimensional matrix and preventing proppant flow back.

These curable phenolic resin coated proppants work best in environments where temperatures are sufficiently high to consolidate and cure the phenolic resins. However, conditions of geological formations vary greatly. In some gas/oil wells, high temperature (>180° F.) and high pressure (>6,000 psi) are present downhole. Under these conditions, most curable proppants can be effectively cured. Moreover, proppants used in these wells need to be thermally and physically stable, i.e., do not crush appreciably at these temperatures and pressures.

Curable resins include (i) resins which are cured entirely in the subterranean formation and (ii) resins which are partially cured prior to injection into the subterranean formation with the remainder of curing occurring in the subterranean formation.

Many shallow wells often have downhole temperatures less than 130° F., or even less than 100° F. Conventional curable proppants will not cure properly at these temperatures. Sometimes, an activator can be used to facilitate curing at low temperatures. Another method is to catalyze proppant curing at low temperatures using an acid catalyst in an overflush technique. Systems of this type of curable proppant have been disclosed in U.S. Pat. No. 4,785,884 to Armbruster and the disclosure of this patent is incorporated by reference in its entirety. In the overflush method, after the curable proppant is placed in the fracture, an acidic catalyst system is pumped through the proppant pack and initiates the curing even at temperatures as low as about 70° F. This causes the bonding of proppant particles.

Due to the diverse variations in geological characteristics of different oil and gas wells, no single proppant possesses all properties which can satisfy all operating requirements under various conditions. The choice of whether to use a precured or curable proppant or both is a matter of experience and knowledge as would be known to one skilled in the art.

In use, the proppant is suspended in the fracturing fluid. Thus, interactions of the proppant and the fluid will greatly affect the stability of the fluid in which the proppant is suspended. The fluid needs to remain viscous and capable of carrying the proppant to the fracture and depositing the proppant at the proper locations for use. However, if the fluid prematurely loses its capacity to carry, the proppant may be deposited at inappropriate locations in the fracture or the well bore. This may require extensive well bore cleanup and removal of the mispositioned proppant.

It is also important that the fluid breaks (undergoes a reduction in viscosity) at the appropriate time after the proper placement of the proppant. After the proppant is placed in the fracture, the fluid shall become less viscous due to the action of breakers (viscosity reducing agents) present in the fluid. This permits the loose and curable proppant particles to come together, allowing intimate contact of the particles to result in a solid proppant pack after curing. Failure to have such contact will give a much weaker proppant pack.

Foam, rather than viscous fluid, may be employed to carry the proppant to the fracture and deposit the proppant at the proper locations for use. The foam is a stable foam that can suspend the proppant until it is placed into the fracture, at which time the foam breaks. Agents other than foam or viscous fluid may be employed to carry proppant into a fracture where appropriate.

Also, resin coated particulate material, e.g., sands, may be used in a wellbore for "sand control." In this use, a cylindrical structure is filled with the proppants, e.g., resin coated particulate material, and inserted into the wellbore to act as a filter or screen to control or eliminate backwards flow of sand, other proppants, or subterranean formation particles. Typically, the cylindrical structure is an annular structure having inner and outer walls made of mesh. The screen opening size of the mesh being sufficient to contain the resin coated particulate material within the cylindrical structure and let fluids in the formation pass therethrough.

While useful proppants are known, it would be beneficial to provide proppants having improved features such as good flow back, good compressive strength, as well as good long term conductivity, i.e., permeability, at the high closure stresses present in the subterranean formation. Flow back, as discussed above, relates to keeping the proppant in the subterranean formation. Compressive strength relates to permitting the proppant to withstand the forces within the subterranean formation. High conductivity directly impacts the future production rate of the well. It would be especially beneficial to provide such proppants from raw materials which can be obtained and processed at relatively low and moderate cost, as well as a process for producing them, such that the formed particle will produce less wear in the equipment used to introduce it into the drill hole because of its low bulk density and its smooth surface.

A separate area of proposed use is in water filtration. In many industrial and non industrial situations there is a need to be able to extract solids from a stream of water. There is a wide range of filtration systems designed to meet these requirements. Most of these systems use a solid particulate to form a filtration pack through which the water containing the solid flows. The particulate (filtration media) retains the solid within the pore space of the pack and allows the water to pass through (with a lower solids content). Periodically, the filter must be back flushed to remove the trapped solids so that the filtration process can continue. A filtration media should have the following traits:

- a high particle surface area so that there are many opportunities to trap the solids.
- the lowest possible density so that the number of pounds required to fill the filter and the flow rate required to back flush (a process that expands the volume of the filter pack) are both minimized.
- be acid/base/solvent resistant so that the media's integrity is unaffected by the presence of these materials.
- be non toxic in nature so that undesirable chemicals are not leached into the water stream being filtered.
- have the ability to be made in various sizes (20/40, 16/30, etc.) and densities so that filter packs can be designed to extract a variety of particles.

Examples of Currently Used Filtration Media are Sand, Ceramics, Activated Charcoal and Walnut Hulls

OBJECTS OF THE INVENTION

It is an object of the present invention to provide low density proppants comprising filler, selected from at least one member of the group consisting of finely divided minerals, fibers, walnut shells, almond shells, and coconut shells, bound by binder.

It is another object of the present invention to provide low density filtration media for extracting solids from a water stream comprising filler, selected from at least one member of the group consisting of finely divided minerals, fibers, walnut shells, almond shells, and coconut shells, bound by binder and/or cement.

It is another object of the present invention to provide methods of using proppant, or filtration media, comprising filler, selected from at least one member of the group consisting of finely divided minerals, fibers, walnut shells, almond shells, and coconut shells, bound by binder and/or cement.

It is another object of the present invention to provide methods of using gravel packing media, comprising filler, selected from at least one member of the group consisting of finely divided minerals, fibers, walnut shells, almond shells, and coconut shells, bound by binder and/or cement.

It is another object of the present invention to provide particles for use on artificial turf sports fields.

These and other objects of the present invention will become apparent from the following specification.

BRIEF DESCRIPTION OF THE DRAWINGS

The following briefly describes the drawing of the present specification, wherein like elements are identified by like numbers.

SUMMARY OF THE INVENTION

Figure 1:
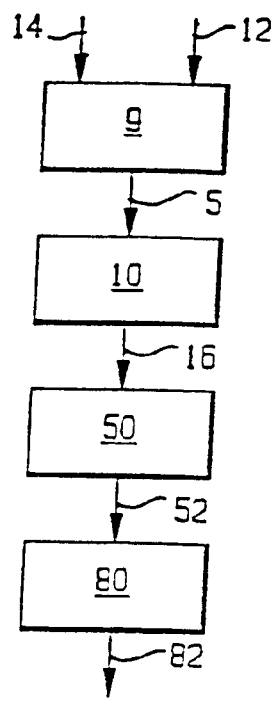
FIG. 1 shows a process flow diagram of a first embodiment of a process for making particles of the present invention.

The invention provides a composite particle for proppant or filtration media comprising filler particles, e.g., finely divided mineral or finely divided mineral and fiber, bound by a suitable organic or inorganic binder. A typical organic binder is selected from at least one member of the group consisting of a phenolic resole resin or phenolic novolac resin, urethanes (for example polyol resins, e.g., phenolic resin, dissolved in petroleum solvents which are cross-linkable with a polymeric isocyanate using an amine catalyst, such as SIGMA SET resins available from Borden Inc., Louisville, Ky.), alkaline modified resoles set by esters (for example, ALPHASET resins available from Borden Inc., Louisville, Ky.), melamine, and furans. Typical inorganic binders include silicates, e.g., sodium silicate, phosphates, e.g., polyphosphate glass, borates, or mixtures thereof, e.g., silicate and phosphate. Typical binders for the present invention also may be selected from polymer/cement combinations and MDF cement.

The filler particles may be any of various kinds of commercially available filler, selected from at least one member of the group consisting of finely divided minerals, fibers, ground almond shells, ground walnut shells, and ground coconut shells.

The finely divided minerals include at least one member of the group consisting of fly ash, silica (quartz sand), alumina, mica, silicate, e.g., orthosilicates or metasilicates, calcium silicate, kaolin, talc, zirconia, boron and glass, e.g., glass microspheres.

The fibers include at least one member selected from the group consisting of milled glass fibers, milled ceramic fibers, milled carbon fibers and synthetic fibers, having a softening point above about 200° F. so as to not degrade, soften or agglomerate during production or use.

The amount and material of the one or more filler materials, as well as the resin and optional cement, are selected such that the composite particle has a bulk density of 0.50 to 1.30 grams per cubic centimeter ($gm/cm^3$), preferably 0.95 to 1.10 $gm/cm^3$, and a grain density (particle density) of 0.90 to 2.20 $gm/cm^3$, preferably 1.40 to 1.60 $gm/cm^3$. For example, a composite particle may comprise a low density filler material (such as ground walnut shells) together with a higher density filler material (such as finely divided silica), and a binder of polymer resin and cement, so long as the respective amounts of these ingredients results in a composite particle having the desired low density. Low density is advantageous in many uses because it facilitates transporting the composite particles and facilitates injection into the subterranean formation. For example, low density gravel packing is very advantageous because it is easy to use.

The present composite particles are substantially spherical. The composite particles typically have a sphericity of at least 0.7, preferably at least 0.85, and most preferably at least 0.90, as measured according to API Method RP56 Section 5.

The composite particles are made by mixing filler particles selected from at least one member of the group consisting of finely divided minerals, fibers, ground walnut shells, ground almond shells, and ground coconut shells with at least one binder. A typical silicate filler is NEPHELINE SYENITE, a whole grain sodium potassium alumina silicate available from Unimin Corporation, New Canaan, Conn. In particular, the composite particles are made by mixing the filler particles with a first portion of binder to form substantially homogeneous core particles of granulated product comprising the filler particles and the first portion of binder. By "substantially homogeneous" it is meant that the core particle has an absence of a large substrate particle as common, for example, for coated sand proppants. To strengthen the composite particles, a second portion of binder may be coated onto the core particles of granulated product. The core binders are preferably precured. The outer coating resins are curable or precured.

For purposes of this application, the term "cured" and "crosslinked" are used interchangeably for the hardening which occurs in an organic binder. However, the term "cured" also has a broader meaning in that it generally encompasses the hardening of any binder, organic or inorganic, to form a stable material. For example, crosslinking, ionic bonding and/or removal of solvent to form a bonded material in its final hardened form may be considered curing. Thus, mere removal of solvent from an organic binder prior to crosslinking may or may not be curing depending upon whether the dry organic binder is in final hardened form.

Optionally, the uncoated composite particles or coated proppant particles are dried, but not cured (e.g., crosslinked), and then undergo a mechanical refining of the surface to smooth it to make it a substantially spherical shape. However, drying may lead to undesired agglomeration. Thus, the benefits and detriments of drying should be considered when deciding whether to include a drying step.

The composite particles, as described in this invention have special and unique properties such as controlled plasticity and elasticity behavior. Because of these unique properties, the composite particles can be applied as the sole proppant in a 100% proppant pack (in the hydraulic fracture) or as a part replacement of existing commercial available ceramic and/or sand-based proppants, resin-coated and/or uncoated, or as blends between those. The composite particles can also be employed as the sole media in a 100% filtration pack or blended with other filtration media.

As applied, the composite particles used as proppants improve flow-back control of the pack, and decrease the forming and generation of fines when used to fill 100% of the fracture or used in a combination pack with other commercially available proppants. As applied, the composite particles also greatly reduce the detrimental effects of embedment and subsequent fines generation (that are the result of the embedment process) that is commonly associated with the use of other commercially available proppants. The reduction in embedment can be attributed to the elastic nature of the composite and its ability to better distribute the downhole stresses. Combining all of these properties of the composite particle will lead to increase in the conductivity/permeability of the pack.

Selecting the below-specified volume proportions of filler and synthetic binder give surprisingly good flexural resistance strength, which is also a measure of a steelball-pointed strength and hardness (Brinell Strength). This is a very important factor for the use of the present materials as proppants. The flexural strengths are generally somewhat higher when quartz sand is used as the mineral than with aluminum oxide.

The proppant according to the invention has higher resistance to compressive forces than some ceramic proppants, and therefore has less grain failure. This reduces point stresses and generates less fines (which can damage fracture conductivity) than previous experience would lead one to expect just from the absolute values of the breaking strength. The preferred sphericity $\phi$ is greater than 0.9, specifically due to the use of appropriate post-processing measures.

The invention also provides improved methods of using the above-described particles as media for water filtration, gravel packing, or as curable and/or precured proppants for treating subterranean formations.

The invention also provides improved artificial turf sports fields and methods of using the above-described particles as media for artificial turf sports fields.

DETAILED DESCRIPTION OF THE PREFERRED EMBODIMENTS

The filler particles of the present invention may be employed with any conventional proppant resin. The type of resin and filler making up the proppant will depend upon a number of factors including the probable closure stress, formation temperature, and the type of formation fluid.

The term resin includes a broad class of high polymeric synthetic substances. Resin includes thermosetting materials, thermoplastic materials, and cold setting materials.

Specific thermosets include epoxy which is a heat set resin when used with a phenolic, (however, epoxy sets with formaldehyde at various temperatures), phenolic, e.g., resole (a true thermosetting resin) or novolac (thermoplastic resin which is rendered thermosetting by a hardening agent), polyester resin, epoxy-modified novolac, furan, and melamine resin.

Epoxy-modified novolac is disclosed by U.S. Pat. No. 4,923,714 to Gibb et al incorporated herein by reference. The phenolic resin comprises any of a phenolic novolac polymer; a phenolic resole polymer; a combination of a phenolic novolac polymer and a phenolic resole polymer; a cured combination of phenolic/furan resin or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the above-mentioned novolac or resole polymers may be phenol moieties or bis-phenol moieties. Resole resins are preferred.

Another heat set binder is polymer/cement combinations in which the polymer comprises a phenol-aldehyde polymer, polyamide, polyimide or olefins such as polyethylene or straight or branched chain polypropylene.

Specific thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Another typical resin is latex.

Among the synthetic rubber polymer bases useful for the purposes of the invention, unsaturated chain polymers or copolymers obtained by polymerization of conjugated dienes and/or aliphatic or aromatic vinyl monomers are preferred.

More particularly, the polymer bases may be selected from the group comprising: natural rubber, 1,4-cis polybutadiene, polychloroprene, 1,4-cis polyisoprene, optionally halogenated isoprene-isobutene copolymers, butadiene-acrylonitrile, styrene-butadiene and styrene-butadiene-isoprene terpolymers, either prepared in solution or in emulsion, ethylene-propylene-diene terpolymers.

Specific cold setting resins include epoxy resins cured with an amine when used alone or with polyurethane, polyurethanes, alkaline modified resoles set by esters (ALPHASETs), furans, e.g., furfuryl alcohol-formaldehyde, urea-formaldehyde, and free methylol-containing melamines set with acid. For the purposes of this description, a cold set resin is any resin which can normally be cured at room temperature. Typically cold set resins cure at a temperature less than 150° F. Thus, for example, at 200° F., phenol-formaldehyde resin heat cures.

Urethanes are disclosed by U.S. Pat. No. 5,733,952 to Geoffrey. Melamine resins are disclosed by U.S. Pat. Nos. 5,952,440, 5,916,966, and 5,296,584 to Walisser. ALPHASET resins are disclosed by U.S. Pat. Nos. 4,426,467 and Re. 32,812 (which is a reissue of U.S. Pat. No. 4,474,904) all of which are incorporated herein by reference.

Macrodefect free (MDF) cement is disclosed by U.S. Pat. Nos. 5,814,146; 5,147,459; 4,353,746; 4,353,747; 4,353,748; 4,410,366; 4,070,199 and the publication Macrodefect-free Cement: A Review, Mat. Res. Soc. Symp. 179 (1991), pp. 101–121, all of which are incorporated herein by reference. MDF cements employ high alumina cement and water soluble polymer such as poly vinyl alcohol or polyacrylamide. MDF cements can also employ high alumina cement and a water resistant polymer such as urethane according to European patent application No. 0280971 to Kataoka et al, incorporated herein by reference. European patent application No. 0021628, incorporated herein by reference, discloses a high alumina MDF cement product modified by the addition of polyvinyl alcohol/acetate.

Polymer resin cement comprises high alumina cement, anhydrous resin precursor, organic solution agent and additives. Polymer resin cement is disclosed by the publication Hasegawa, M., et al, A New Class of High Strength, Water and Heat Resistant Polymer-Cement Composite Solidified By an Essentially Anhydrous Phenol Resin Precursor, Cement and Concrete Research 25 (1995) 6, pp. 1191–1198, U.S. Pat. Nos. 5,651,816 to Kobayashi et al, 4,003,873 to Smith, 5,785,751 to Bashlykov et al, 4,820,766 to Lahalih et al, and 5,478,391 to Babaev et al, all of which are incorporated herein by reference.

A. Filler Particles

The filler particles should be inert to components in the subterranean formation, e.g., well treatment fluids, and be able to withstand the conditions, e.g., temperature and pressure, in the well. Filler particles, e.g., one or more of ground almond shells, ground coconut shells, ground walnut shells, finely divided minerals and fibers, of different dimensions and/or materials may be employed together. The finely divided mineral filler particle is typically monocrystalline in nature, to be more abrasion resistant, and thus enhance the ability of the composite particle to withstand pneumatic conveying.

It is important that the dimensions and amount of filler particles, as well as the type and amount of resin, be selected so that the filler particles remain within the resin of the proppant rather than being loosely mixed with proppant particles. The containment of filler particles prevents loose particles from clogging parts, e.g., screens, of an oil or gas well. Moreover, the attachment prevents loose particles from decreasing permeability in the oil or gas well.

It is also important that the amount and material of the one or more filler materials, as well as the resin and optional cement, are selected such that the composite particle has a bulk density of 0.50 to 1.30 grams per cubic centimeter (gm/cm$^3$), preferably 0.95 to 1.10 gm/cm$^3$, and a grain density (particle density) of 0.90 to 2.20 gm/cm$^3$, preferably 1.40 to 1.60 gm/cm$^3$. For example, a composite particle may comprise a low density filler material (such as ground walnut shells) together with a higher density filler material (such as finely divided silica) bound by polymer resin and cement, so long as the respective amounts of these ingredients results in a composite particle having the desired light density.

1. Finely Divided Minerals

The finely divided minerals include at least one member of the group consisting of silica (quartz sand), alumina, fumed carbon, carbon black, graphite, mica, silicate, calcium silicate, calcined or uncalcined kaolin, talc, zirconia, boron and glass. Microcrystalline silica is especially preferred. A typical silicate for use as filler is NEPHELINE SYENITE, a whole grain sodium potassium alumina silicate available from Unimin Corporation, New Canaan, Conn.

The particles of finely divided minerals range in size from about 2 to about 60 $\mu$m. Typically, the particles of minerals have a $d_{50}$ of about 4 to about 45 $\mu$m, preferably about 4 to about 6 $\mu$m. The parameter $d_{50}$ is defined as the diameter for which 50% of the weight of particles have the specified particle diameter. Preferred filler would be angular or sub-angular rather than rounded in shape. One example of such preferred material is MIKRODORSILIT 120L microcrystalline silica flour, available from Capital Gebr. Dorfner GmbH and Company, Germany.

Most mineral fillers have a grain density of 2.45 to 3.20 gr/cm$^3$, preferably 2.50 to 2.80 gr/cm$^3$. However, some potential mineral fillers include those which make the proppant particle less dense, such as fly ash or hollow glass microspheres. Hollow glass microspheres have a grain density of 0.57 to 0.82 gr/cm$^3$, preferably 0.60 to 0.65 gr/cm$^3$.

Fly ash, with a typical $SiO_2$ content between 40 and 60% by weight and typical $Al_2O_3$ content between 20 and 40% by weight, can also be used as the mineral to save materials costs for certain requirements. Fly ash has a grain density of 1.10 to 1.50 gr/cm$^3$, preferably 1.15 to 1.20 gr/cm$^3$. The typical grain size of this material ($d_{50}$) is up to 35 $\mu$m, so that grinding down to the preferred value of 4 to 6 $\mu$m might still be conducted. The fly ash should have a minimal amount of carbon, whose presence would weaken the proppant particle.

2. Fibers

The fibers may be any of various kinds of commercially available short fibers. Such fibers include at least one member selected from the group consisting of milled glass fibers, milled ceramic fibers, milled carbon fibers, natural fibers, and synthetic fibers, e.g., crosslinked novolac fibers, having a softening point above typical starting temperature for blending with resin, e.g., at least about 200° F., so as to not degrade, soften or agglomerate.

The typical glasses for fibers include E-glass, S-glass, and AR-glass. E-glass is a commercially available grade of glass fibers typically employed in electrical uses. S-glass is used for its strength. AR-glass is used for its alkali resistance. The carbon fibers are of graphitized carbon. The ceramic fibers are typically alumina, porcelain, or other vitreous material.

Fiber lengths range from about 6 microns to about 3200 microns (about 1/8 inch). Preferred fiber lengths range from about 10 microns to about 1600 microns. More preferred fiber lengths range from about 10 microns to about 800 microns. A typical fiber length range is about 0.001 to about 1/16 inch. Preferably, the fibers are shorter than the greatest length of the substrate. Suitable, commercially available fibers include milled glass fiber having lengths of 0.1 to about 1/32 inch; milled ceramic fibers 25 microns long; milled carbon fibers 250 to 350 microns long, and KEVLAR aramid fibers 12 microns long. Fiber diameter (or, for fibers of non-circular cross-section, a hypothetical dimension equal to the diameter of a hypothetical circle having an area equal to the cross-sectional area of the fiber) range from about 1 to about 20 microns. Length to aspect ratio (length to diameter ratio) may range from about 5 to about 175. The fiber may have a round, oval, square, rectangular or other appropriate cross-section. One source of the fibers of rectangular cross-section may be chopped sheet material. Such chopped sheet material would have a length and a rectangular cross-section. The rectangular cross-section has a pair of shorter sides and a pair of relatively longer sides. The ratio of lengths of the shorter side to the longer side is typically about 1:2–10. The fibers may be straight, crimped, curled or combinations thereof.

3. Ground Shells

As stated above, a typical low density filler materials are one or more materials selected from the group consisting of ground almond shells, ground coconut shells and ground walnut shells. These shells are ground to finely divided particles which range in size from about 2 to about 60 $\mu$m. Typically, the particles have a $d_{50}$ of about 4 to about 45 $\mu$m, preferably about 4 to about 6 $\mu$m. It is theorized that because these ground shells are porous, they absorb resin to strengthen the composite particle.

Ground almond shells have a grain density of 1.30 to 1.50 gr/cm$^3$, preferably 1.35 to 1.45 gr/cm$^3$. Ground coconut shells have a grain density of 1.30 to 1.50 gr/cm$^3$, preferably 1.35 to 1.45 gr/cm$^3$. Ground walnut shells have a grain density of 1.30 to 1.50 gr/cm$^3$, preferably 1.35 to 1.45 gr/cm$^3$.

B. Phenolic Resole and/or Novolac Resins

1. Resole Resins

The phenol-aldehyde resole resin has a phenol:aldehyde molar ratio from about 1:1 to about 1:3, typically from about 1:1 to about 1:1.95. A preferred mode of preparing the resole resin is to combine phenol with a source of aldehyde such as formaldehyde, acetaldehyde, propionaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.1 to 1:1.6. The resoles may be conventional resoles or modified resoles. Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol.

Modified resole resins include alkoxy modified resole resins. Of alkoxy modified resole resins, methoxy modified resole resins are preferred. However, the phenolic resole resin which is most preferred is the modified orthobenzylic ether-containing resole resin prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Phenols suitable for preparing the modified orthobenzylic ether-containing phenolic resole resins are generally any of the phenols which may be utilized in the formation of phenolic resins, and include substituted phenols as well as unsubstituted phenol per se. The nature of the substituent can vary widely, and exemplary substituted phenols include alkyl-substituted phenols, aryl-substituted phenols, cycloakyl-substituted phenols, alkenyl-substituted phenols, alkoxy-substituted phenols, aryloxy-substituted phenols and halogen-substituted phenols. Specific suitable exemplary phenols include in addition to phenol per se, o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. A preferred phenolic compound is phenol itself.

The aldehyde employed in the formation of the modified phenolic resole resins can also vary widely. Suitable aldehydes include any of the aldehydes previously employed in the formation of phenolic resins, such as formaldehyde, acetaldehyde, propionaldehyde and benzaldehyde. In general, the aldehydes employed contain from 1 to 8 carbon atoms. The most preferred aldehyde is an aqueous solution of formaldehyde.

Metal ion catalysts useful in production of the modified phenolic resins include salts of the divalent ions of Mn, Zn, Cd, Mg, Co, Ni, Fe, Pb, Ca and Ba. Tetra alkoxy titanium compounds of the formula Ti(OR)$_4$ where R is an alkyl group containing from 3 to 8 carbon atoms, are also useful catalysts for this reaction. A preferred catalyst is zinc acetate. These catalysts give phenolic resole resins wherein the preponderance of the bridges joining the phenolic nuclei are ortho-benzylic ether bridges of the general formula —CH$_2$(OCH$_2$)$_n$— where n is a small positive integer.

A molar excess of aldehyde per mole of phenol is used to make the modified resole resins. Preferably the molar ratio of phenol to aldehyde is in the range of from about 1:1.1 to about 1:2.2. The phenol and aldehyde are reacted in the presence of the divalent metal ion catalyst at pH below about 7. A convenient way to carry out the reaction is by heating the mixture under reflux conditions. Reflux, however, is not required.

To the reaction mixture is added an aliphatic hydroxy compound which contains two or more hydroxy groups per molecule. The hydroxy compound is added at a molar ratio of hydroxy compound to phenol of from about 0.001:1 to about 0.03:1. This hydroxy compound may be added to the phenol and aldehyde reaction mixture at any time when from 0% (i.e., at the start of the reaction) to when about 85% of the aldehyde has reacted. It is preferred to add the hydroxy compound to the reaction mixture when from about 50% to about 80% of the aldehyde has reacted.

Useful hydroxy compounds which contain two or more hydroxy groups per molecule are those having a hydroxyl number of from about 200 to about 1850. The hydroxyl number is determined by the standard acetic anhydride method and is expressed in terms of mg KOH/g of hydroxy compound. Suitable hydroxy compounds include ethylene glycol, propylene glycol, 1,3-propanediol, diethylene glycol, triethylene glycol, glycerol, sorbitol and polyether polyols having hydroxyl numbers greater than about 200. Glycerol is a particularly suitable hydroxy compound.

After the aliphatic hydroxy compound containing two or more hydroxy groups per molecule is added to the reaction mixture, heating is continued until from about 80% to about 98% of the aldehyde has reacted. Although the reaction can be carried out under reflux until about 98% of the aldehyde has reacted, prolonged heating is required and it is preferred to continue the heating only until about 80% to 90% of the aldehyde has reacted. At this point, the reaction mixture is heated under vacuum at a pressure of about 50 mm of Hg until the free formaldehyde in the mixture is less than about 1%. Preferably, the reaction is carried out at 95° C. until the free formaldehyde is less than about 0.1% by weight of the mixture. The catalyst may be precipitated from the reaction mixture before the vacuum heating step if desired. Citric acid may be used for this purpose. The modified phenolic resole may be "capped" to be an alkoxy modified phenolic resole resin. In capping, a hydroxy group is converted to an alkoxy group by conventional methods that would be apparent to one skilled in the art given the teachings of the present disclosure.

Metal ion catalysts useful in production of the modified phenolic resole resins include salts of the divalent ions of Mn, Zn, Cd, Mg, Co, Ni, Fe, Pb, Ca and Ba. Tetra alkoxy titanium compounds of the formula $Ti(OR)_4$ where R is an alkyl group containing from 3 to 8 carbon atoms, are also useful catalysts for this reaction. A preferred catalyst is zinc acetate. These catalysts give phenolic resole resins wherein the preponderance of the bridges joining the phenolic nuclei are ortho-benzylic ether bridges of the general formula —$CH_2(OCH_2)_n$— where n is a small positive integer.

2. Phenol-Aldehyde Novolac Polymer-Containing Resins

An embodiment of the present invention employs resin which includes phenol-aldehyde novolac polymer. The novolac may be any novolac employed with proppants. The novolac may be obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic acid, or para toluenesulfonic acid. An alternative way to make novolacs is to react a phenol and an aldehyde in the presence of divalent inorganic salts such as zinc acetate, zinc borate, manganese salts, cobalt salts, etc. The selection of catalyst may be important for directing the production of novolacs which have various ratios of ortho or para substitution by aldehyde on the phenolic ring, e.g., zinc acetate favors ortho substitution. Novolacs enriched in ortho substitution, i.e., high-ortho novolacs, may be preferred because of greater reactivity in further cross-linking for polymer development. High ortho novolacs are discussed by Knop and Pilato, *Phenolic Resins,* p. 50–51 (1985) (Springer-Verlag) incorporated herein by reference. High-ortho novolacs are defined as novolacs wherein at least 60% of the total of the resin ortho substitution and para substitution is ortho substitution, preferably at least about 70% of this total substitution is ortho substitution.

The novolac polymer typically comprises phenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfural, benzaldehyde or other aldehyde sources. Formaldehyde itself is preferred.

The novolacs used in this invention are generally solids such as in the form of a flake, powder, etc. The molecular weight of the novolac will vary from about 500 to 10,000, preferably 1,000 to 5,000 depending on their intended use. The molecular weight of the novolacs in this description of the present invention are on a weight average molecular weight basis. High-ortho novolac resins are especially preferred.

The resin composition typically comprises at least 10 weight percent novolac polymer, preferably at least about 20 weight percent novolac polymer, most preferably about 50 to about 70 weight percent novolac polymer. The remainder of the resin composition could include crosslinking agents, modifiers or other appropriate ingredients.

The phenolic moiety of the novolac polymer is selected from phenols of Formula I or bisphenols of Formula II, respectively:

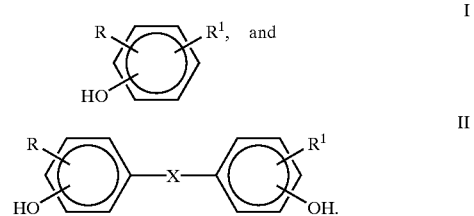

R and $R^1$ are independently alkyl, aryl, arylalkyl or H. In Formula II, R and $R^1$ are preferably meta to the respective hydroxy group on the respective aromatic ring. Unless otherwise defined, alkyl is defined as having 1 to 6 carbon atoms, and aryl is defined as having 6 carbon atoms in its ring. In Formula II, X is a direct bond, sulfonyl, alkylidene unsubstituted or substituted with halogen, cycloalkylidene, or halogenated cycloalkylidene. Alkylidene is a divalent organic radical of Formula III:

$$\begin{array}{c} R^1 \\ | \\ -C- \\ | \\ R^3 \end{array} \quad \text{III}$$

When X is alkylidene, $R^2$ and $R^3$ are selected independently from H, alkyl, aryl, arylalkyl, halogenated alkyl, halogenated aryl and halogenated arylalkyl. When X is halogenated alkylidene, one or more of the hydrogen atoms of the alkylidene moiety of Formula II are replaced by a halogen atom. Preferably the halogen is fluorine or chlorine. Also, halogenated cycloalkylidene is preferably substituted by fluorine or chlorine on the cycloalkylidene moiety.

A typical phenol of Formula I is phenol, per se.

Typical bisphenols of Formula II include Bisphenol A, Bisphenol C, Bisphenol E, Bisphenol F, Bisphenol S, or Bisphenol Z.

The present invention includes novolac polymers which contain any one of the phenols of Formula I, bisphenols of Formula II, or combinations of one or more of the phenols of Formula I and/or one or more of the bisphenols of Formula II. The novolac polymer may optionally be further modified by the addition of VINSOL®, epoxy resins, bisphenol, waxes, or other known resin additives. One mode of preparing an alkylphenol-modified phenol novolac polymer is to combine an alkylphenol and phenol at a molar ratio above 0.05:1. This combination is reacted with a source of formaldehyde under acidic catalysis, or divalent metal catalysis (e.g., Zn, Mn). During this reaction, the combination of alkylphenol and phenol is present in molar excess relative to the formaldehyde present. Under acidic conditions, the polymerization of the methylolated phenols is a faster reaction than the initial methylolation from the formaldehyde. Consequently, a polymer structure is built up consisting of phenolic and alkylphenolic nuclei, linked together by methylene bridges, and with essentially no free methylol groups. In the case of metal ion catalysis, the polymerization will lead to methylol and benzylic ethers, which subsequently break down to methylene bridges, and the final product is essentially free of methylol groups.

3. Crosslinking Agents and Other Additives for Use with Phenolic Novolacs

For practical purposes, phenolic novolacs do not harden upon heating, but remain soluble and fusible unless a hardener (crosslinking agent) is present. Thus, in curing a novolac resin, a crosslinking agent is used to overcome the deficiency of alkylene-bridging groups to convert the resin to an insoluble infusible condition.

Appropriate crosslinking agents include hexamethylene-tetramine (HEXA), paraformaldehyde, oxazolidines, melamine resin or other aldehyde donors and/or the above-described resole polymers. Each of these crosslinkers can be used by itself or in combinations with other crosslinkers. The resole polymer may contain substituted or unsubstituted phenol.

A resin composition of this invention typically comprises up to about 25 weight percent HEXA and/or up to about 90 weight percent resole polymers based on the total weight of coating composition. Where HEXA is the sole crosslinking agent, the HEXA comprises from about 5 to about 25 weight percent of the resin. Where the phenol-aldehyde resole polymer is the sole crosslinking agent, the resin contains from about 20 to about 90 weight percent of the resole polymer. The composition may also comprise combinations of these crosslinkers.

Additives are used for special cases for special requirements. The resin systems of the invention may include a wide variety of additive materials. The resin may also include one or more other additives such as a coupling agent such as a silane to promote adhesion of the coating to substrate, a silicone lubricant, a wetting agent, a surfactant, dyes, flow modifiers (such as flow control agents and flow enhancers), and/or anti-static agents. The surfactants may be anionic, nonionic, cationic, amphoteric or mixtures thereof. Certain surfactants also operate as flow control agents. Other additives include humidity resistant additives or hot strength additives. Of course, the additives may be added in combination or singly.

4. Method to Make Resoles

A typical way to make resoles is to put a phenol in a reactor, add an alkaline catalyst, such as sodium hydroxide or calcium hydroxide, and aldehyde, such as a 50 weight % solution of formaldehyde, and react the ingredients under elevated temperature until the desired viscosity or free formaldehyde is achieved. Water content is adjusted by distillation. Elasticizers or plastizers, such as bisphenol A or cashew nut oil, may also be present to enhance the binder elasticity or plasticity. Other known additives may also be present.

5. Method to Make Novolac Polymer

To make phenolic novolac polymers with one or more phenols of Formula I, the phenol is mixed with acidic catalyst and heated. Then an aldehyde, such as a 50 weight % solution of formaldehyde is added to the hot phenol and catalyst at elevated temperature. Water made by the reaction is removed by distillation to result in molten novolac. The molten novolac is then cooled and flaked.

To make novolac polymers with bisphenols of Formula II, the bisphenol is mixed with a solvent, such as n-butyl acetate, at elevated temperature. An acid catalyst such as oxalic acid or methane sulfonic acid is then added and mixed with the bisphenol and then an aldehyde, typically formaldehyde, is added. The reactants are then refluxed. It is noted that the preparation of the novolac resin can occur under acidic catalysis, or divalent metal catalysis (e.g., Zn, Mn), wherein the bisphenol is present in greater than equimolar amount relative to the source of aldehyde. After reflux, water is collected by azeotropic distillation with n-butyl acetate. After removal of the water and n-butyl acetate, the resin is flaked to yield resin products. Alternatively, the polymers can be made using water as a solvent.

6. Reacting Aldehyde with Phenol-Aldehyde Novolacs or Bisphenol-Aldehyde Novolacs Phenol-aldehyde novolacs or bisphenol-aldehyde novolacs may be modified by reacting these novolacs with an additional quantity of aldehyde using a basic catalyst. Typical catalysts used are sodium hydroxide, potassium hydroxide, barium hydroxide, calcium hydroxide (or lime), ammonium hydroxide and amines.

In the case of phenol-aldehyde polymers or bisphenol-aldehyde polymers, the molar ratio of added aldehyde to phenolic moiety, based on the phenolic moiety monomeric units in the novolac, ranges from 0.4:1 to 3:1, preferably from 0.8:1 to 2:1. This achieves a cross-linkable (reactive) polymer having different chemical structures and generally higher molecular weights than the resole polymers obtained by a single step process which involves initially mixing bisphenol monomers and aldehyde with an alkaline catalyst at the same molar ratio of the combined aldehyde and bisphenol. Furthermore, it is feasible to use different aldehydes at different stages of the polymer preparation.

These polymers can be used alone or with other polymers, such as phenol-aldehyde novolacs, bisphenol-aldehyde novolac, or combinations thereof, as a crosslinking agent, or as a component of crosslinking agents. When the aldehyde-modified polymers are employed as crosslinking agents, they may be used with other typical crosslinking agents such as those described above for novolac polymers.

7. Methods to Make Proppant, Gravel Packing or Filtration Media with Resole or Novolac Heat Set Resins After making the resole or novolac resins, the crosslinking agent, resin and filler particles are mixed at conditions to provide either a precured or curable resin composition, as desired. Whether a resin composition is of the precured or curable type depends upon a number of parameters. Such parameters include the ratio of the novolac resin to the curing agent; the acidity of the novolac resin; the pH of the resole resin; the amount of the crosslinking agent; the time of mixing the resin compositions and filler particles; the temperature of the resin compositions and filler particles during mixing; catalysts (if any) used during the mixing and other process parameters as known to those skilled in the art. Typically, the precured or curable proppants may contain resole resin in the presence or absence of novolac resin.

FIG. 1 shows a simplified process flow diagram of a first embodiment of a process for making proppants, gravel packing, or filtration media of the present invention. In the process, a binder stream 12 and a filler particle stream 14 are fed to a high intensity mixer 9 to prepare a homogeneous slurry stream 5. Slurry stream 5 feeds a granulator 10 to produce a granulated product stream 16. The binder stream 12 contains resin, water and conventional additives. Typically, the resin is a resole and may act as its own crosslinking agent. Coupling agents are also typical additives. A typical granulator 10 is an Eirich mixer, such as an Eirich R11 mixer, manufactured by Eirich Machines, Inc., Gurnee, Ill.

Typically, the granulator 10 is operated as a batch process and is operated as disclosed generally in EP 308 257 and U.S. Pat. No. Re. 34,371, both of which are incorporated herein by reference. For example, EP 308 257 discloses making ceramic particles in an Eirich machine described in U.S. Pat. No. 3,690,622. The machine comprises a rotatable cylindrical container, the central axis of which is at an angle to the horizontal, one or more deflector plates, and at least one rotatable impacting impeller usually located below the apex of the path of rotation of the cylindrical container. The rotatable impacting impeller engages the material being mixed and may rotate at a higher angular velocity than the rotatable cylindrical container.

The following sequence occurs in the mixer pelletizer (granulator 10): (1) nucleation or seeding at which time slurry is added near the impacting impeller; (2) growth of the spheroids during which the impacting impeller rotates at slower speed than during the nucleation step; and (3) polishing or smoothing the surfaces of the spheroids by turning off the impacting impeller and allowing the cylindrical container to rotate.

The amount of binder (resin) generally comprises about 10 to about 30, preferably about 10 to about 25, weight percent of the total dry materials (resin, filler, etc.) fed to the granulator 10. The amount of binder being a water free value defined as the amount of resin, e.g., novolac and/or resole, and additives other than water. Typically, the mixing occurs in the presence of a coupling agent such as gamma/amino propel trimethoxy silane. The coupling agent may be added to the mixer 9 before, or premixed with the binder stream 12. Typically, 0 to 50% of the total binder stream 12 is water. Typically, mixing time ranges from 1 to 5 minutes at a pan rotation speed of 50 to 80 rpm and a chopper speed of 1400 to 1600 rpm. The granulation (nucleation time) ranges from about 2 to about 10 minutes with a vessel speed of 25 to 45 rpm and a chopper speed of 1400 to 1600 rpm. The smoothing is also known as "chopping." The temperature of the granulator 10 during the above steps ranges from 10 to 40° C.

The granulated material stream 16 then passes to a curing apparatus 50. Typically, curing apparatus 50 is a drying oven operating at a residence time for the granulated material of about 1 minute to about 2 hours, at a temperature of about 90° to about 200° C., preferably about 150° to about 190° C. This produces a cured granulated product stream 52 which feeds a screening apparatus 80 to recover a proppant product stream 82 of predetermined product size. A typical screening apparatus 80 is a sieve such as a vibrating screen. A typical desired proppant particle has a $d_{50}$ from 0.4 to 0.8 mm, or a particle diameter range of 20 to 40 USS mesh (0.425 to 0.85 mm) or 30 to 40 USS mesh.

Figure 2:
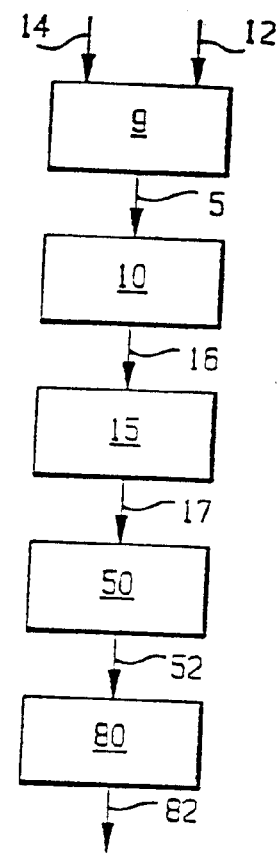
FIG. 2 shows a process flow diagram of a second embodiment of a process for making particles of the present invention.

FIG. 2 shows a second embodiment of a process for making proppants, gravel packing, or filtration media of the present invention. This embodiment resembles the process of FIG. 1 except that the granulated material stream 16 is fed dried but uncured to a refining apparatus 15 to mechanically increase the sphericity of the granulated material to a sphericity of at least about 0.8, preferably at least about 0.85, and more preferably at least about 0.9, and produce a stream 17 of such mechanically treated material.

This step performs a mechanical refining of the surface to make it approximately a spherical shape. For example, this is typically done either by putting the granules of FIG. 2, dried at 40° C., but not cured, in a granulating pan with a high tilt angle and high rotational speed, or by processing them in a SPHERONIZER device, manufactured by Calvera Process Solutions Limited, Dorset, England, at 400–1000 rpm for about 3 to about 30 minutes. The smoothing occurred by a removal process (grinding process) in which the particles in a profiled rotating pan are thrown out against a cylindrical wall and then rolled back onto the plate of the pan.

Alternatively, the particles may be smoothed and compressed by rolling before curing.

Figure 3:
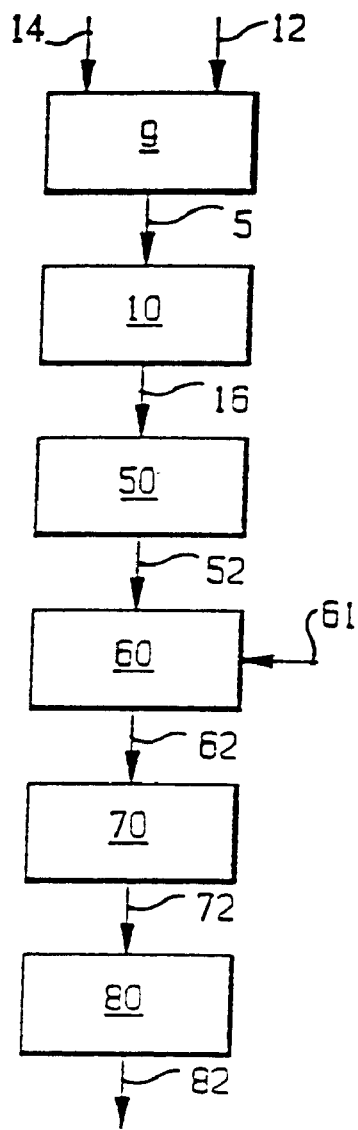
FIG. 3 shows a process flow diagram of a third embodiment of a process for making particles of the present invention.

FIG. 3 shows a process flow diagram of a third embodiment of a process for making proppants or gravel packing of the present invention.

The process is similar to that of FIG. 2 except that the cured granulated product stream 52 is fed to a coating apparatus 60 which coats/impregnates the cured granulated material of stream 52 with additional resin from a second binder stream 61. This produces proppant particles having a core of resin and filler, wherein the core is coated with resin. In particular, the cured (or partially cured) stream 52 of core particles discharges from the curing apparatus 50 and then feeds the coating apparatus 60. The coating apparatus 60 is typically a profiled rotating drum or some form of batch mixer. This rotating drum apparatus may have a rotation speed of 16–20 rotations/min. Typically, the second resin stream 61 is preheated to 50–60° C. and sprayed into the rotating drum apparatus (containing the formed particles) through a nozzle with air atomizing. This rotating drum apparatus operates as a batch process with a process time of about 5 to 20 minutes.

If an Eirich mixer is employed as the coating apparatus, it typically operates at a vessel rotation speed of 20–40, preferably 30–35, rotations/min and a chopper speed of 700–1100, preferably 800–1000, rotations per minute with a process time of 2–10 minutes, preferably 2–5 minutes.

The second binder stream 61 typically contains a solution of resin, water, and conventional resin additives. The dry weight ratio of the binder stream 12 to the second binder stream 61 is about 70 to 60:30 to 40. Second stream 61 and stream 52 are preferably fed to the coating apparatus 60 to provide a weight ratio of second stream resin (on a water free basis) to uncoated proppant particles of about 1 to 10 parts resin:95 parts uncoated proppant particles. The resin in the first binder stream 12 may be the same or different from the resin in the second binder stream 61. Alternatively, when a proppant having curable resin in its core is desired, the oven 50 may be operated to merely dry the coated proppant.

Preferably, stream 16 is fed to a refining apparatus (not shown) such as refining apparatus 15 of FIG. 2 prior to curing/drying in apparatus 50.

The coated proppant discharges from the coating apparatus 60 as the coated proppant stream 62 and then feeds the curing apparatus 70.

The curing apparatus 70 is typically a chamber dryer which heats the proppant from a temperature of about 120° to about 180° C. on flat plates (or it may be a rotary drier). The curing apparatus 70 maintains the coated proppant at a suitable curing temperature, for example about 120° to about 180° C. for a suitable curing time, for example about 1 minute to about 2 or more hours. If a proppant having a curable coating is desired, then curing apparatus 70 is operated to dry, or partially cure, the coating. The cured proppant is discharged from the curing apparatus 70 as a cured proppant particle stream 72 which is sieved in a sieving apparatus 80 to recover a proppant product stream 82 of a predetermined particle size range. A typical predetermined particle size range is about 20 to about 40 mesh. A typical sieving apparatus 80 is a vibration sieve. Particles having a size outside the predetermined particle size are discharged as stream 84.

Figure 4:
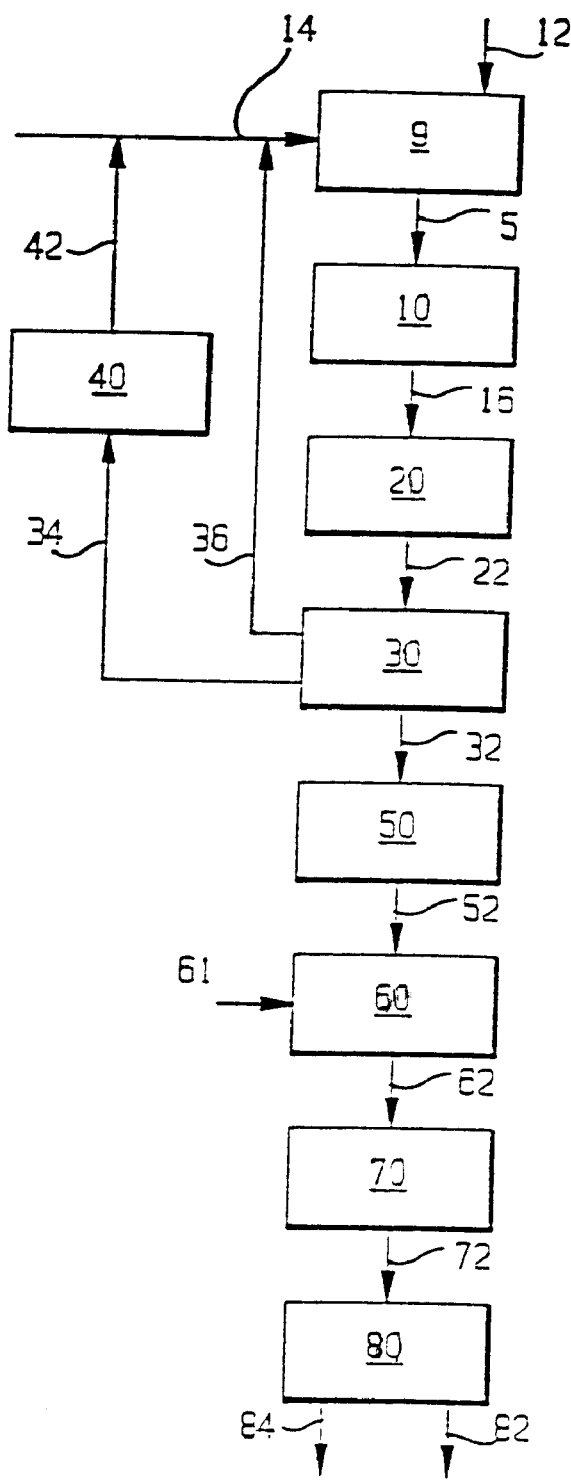
FIG. 4 shows a process flow diagram of the process of FIG. 3 modified to include recycle of particles.

FIG. 4 generally shows the process of FIG. 3 with a recycle step. The granulated material is discharged from the granulator 10 as stream 16 and may pass to an curing apparatus 20 to at least partially cure the materials to withstand screening. Curing apparatus 20 is a chamber dryer operating at a temperature of about 120° to 180° C. for a time sufficient to remove water to be dry enough that the particles do not stick together. Typical times range from about 1 minute to 2 hours. As with the process of FIG. 3, a refining step may further be employed on stream 16.

Dried granulated material stream 22 is then fed to a sieve 30. A typical sieve 30 is a vibrating screen. Sieved particles of predetermined mesh size range are discharged as a sieved stream 32. Particles of a size larger than the predetermined mesh size range are discharged as a first recycle stream 34 which is sent to a crusher 40 and then is recycled to the granulator 10. A typical predetermined mesh size for these core particles is about 8 to about 20 mesh. Another typical desired size range is 20 to 40 mesh. Particles of a size smaller than the predetermined size are recycled to the granulator 10 as a second recycle stream 36.

Sieved stream 32 passes to the curing apparatus 50. Curing apparatus 50 may be a chamber dryer which cures the material on flat plates and operates at a temperature of 120° to 200° C., preferably 150° to 190° C., for a time to produce a desired degree of curing. Typical curing time ranges from 1 minute to 2 hours. However, this curing step may be omitted, and the particles merely dried, if the particles of sieved stream 32 have the sufficient degree of (or lack of) curing. The cured (or partially cured) stream 52 of proppant particles discharges from the curing apparatus 50 and then feeds the coating apparatus 60. An example of starting material for operation of the process of FIG. 4 may be summarized as shown by TABLE 1 to make a composite particle. However, the resulting composite would have too high a density to be within the present invention. Thus, the ingredients could be changed by substituting a low density filler, e.g., hollow glass microspheres, for some or all of the nepheline syenite to achieve the desired low density composite particle of the present invention.

TABLE 1

Starting materials
filler: nepheline syenite $d_p$ = 8 μm; ρ = 2.65 g/cm³
binder/coating: Resole resin* ρ = 1.23 g/cm³

| | Composition | | | | | |
|---|---|---|---|---|---|---|
| | weight percent (solvent included basis) | | weight percent (solvent free basis) | | volume percent (solvent included basis) | |
| | Resole resin | filler | resole | filler | Resole resin | filler |
| pregranulate of Eirich-mixer | 16 | 84 | 12.1 | 87.9 | 29.1 | 70.9 |
| product after coating | 20 | 80 | 15.3 | 84.7 | 35 | 65 |

*Mixture of resole and solvent available from Borden Chemical, Inc. (72% solid resole in resole resin). Unless specified otherwise, all composition percentages in the present disclosure are weight percent.

Typical operation of the process of FIG. 4 is summarized as shown by TABLE 2.

TABLE 2

| mixing/granulation equipment: | Eirich-mixer R02 (Lab scale equipment) |
|---|---|
| composition: | 84 wt. % filler, 16 wt % Resole resin on a solvent included basis |

TABLE 2-continued

| processing: | batch process |
|---|---|
| | mixing time 2 min |
| | (vessel 64 min⁻¹, chopper 1500 min⁻¹) |
| | granulation time 3–5 min |
| | (vessel 32 min⁻¹, chopper 1500 min⁻¹) |
| | moisture correction (depending on particle size of filler by adding of water or filler; Rule: higher moisture = greater grains |
| | visual process controlling on samples for grain size/granulation time |
| drying equipment: | chamber dryer/rotating kiln |
| processing: | 60 ° C./1 hour |
| sieving equipment: | vibration sieve |
| processing: | 18/30 mesh |
| curing equipment: | chamber dryer |
| processing: | heating 120–160° C./1 min. to 2 hours |
| | 180° C./1 min. to 2 hours |
| | material on flat plates |
| coating equipment: | rotating plate or Eirich mixer |
| composition: | 5 wt. % Resole resin on a solvent included basis, 95 weight percent granulate |
| processing: | batch process |
| | a) rotating plate TR10 |
| | rotation 16–20 min⁻¹ |
| | preheating resole resin 50–60° C. |
| | nozzle with air atomizing |
| | process time 10 min |
| | b) Eirich mixer R02 |
| | vessel 32 min⁻¹ |
| | chopper 900 min⁻¹ |
| | preheating resole resin 50–60° C. |
| | liquid dosage in the batch |
| | process time 3 min |
| curing equipment: | chamber dryer/rotating kiln |
| processing: | 180° C./1 min. to 2 hours |
| | heating 120–180° C./1 min. to 2 hours |
| | material on flat plates |
| sieving equipment: | vibration sieve |
| processing: | 18/30 mesh |

Proppants may also be made by modifying the above processes by extruding pellets in an extruder and then mechanically making the pellets spherical (rather than granulating spherical pellets in an Eirich mixer.

C. Urethane Resins

Polyurethane resins are made by mixing a polyisocyanate component, a polyhydroxy component and a catalyst. Typically the polyhydroxy component is a polyhydroxy phenolic component dissolved in solvent. Generally the solvents are mixtures of hydrocarbon and polar organic solvents such as organic esters. Exemplary hydrocarbon solvents include aromatic hydrocarbons such as benzene, toluene, xylene, ethyl benzene, high boiling aromatic hydrocarbon mixtures, heavy naphthas and the like.

1. The Polyhydroxy Component

The polyhydroxy component is generally a phenolic resole resin or alkoxy modified resole resin as described above.

2. Isocyanates

The isocyanate component which can be employed in a binder according to this invention may vary widely and has a functionality of 2 or more. As defined herein, polyisocyanates include isocyanates having such functionality of 2 or more, e.g., diisocyanates, triisocyanates, etc. Exemplary of the useful isocyanates are organic polyisocyanates such as tolylene-2,4-diisocyanate, tolylene-2,6-diisocyanate, and mixtures thereof, particularly crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4"-triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general Formula III:

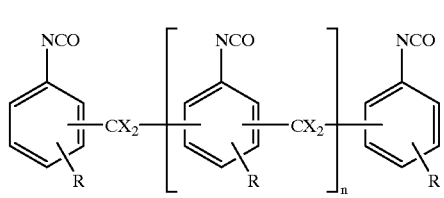

wherein R is selected from the group consisting of hydrogen, chlorine, bromine, and alkyl groups having 1 to 5 carbon atoms; X is selected from the group consisting of hydrogen, alkyl groups having 1 to 10 carbon atoms and phenyl; and n has an average value of generally about 0 to about 3. The preferred polyisocyanate may vary with the particular system in which the binder is employed.

3. Coupling Agents

In the practice of this invention with urethanes, coupling agents may be employed. Such coupling agents include, for example, organo silanes which are known coupling agents. The use of such materials may enhance the adhesion between the binder and the filler. Examples of useful coupling agents of this type include amino silanes, epoxy silanes, mercapto silanes, hydroxy silanes and ureido silanes.

4. Catalysts

The above-described isocyanate and/or below-described epoxy compositions are cured by means of a suitable catalyst. The catalyst employed is generally a volatile catalyst or a liquid catalyst. At least enough catalyst is employed to cause substantially complete reaction of the polyhydroxy phenolic resin component and the isocyanate component and/or cure the epoxy.

Preferred exemplary curing catalysts are volatile basic catalysts, e.g., tertiary amine gases, which are passed through a mass of core particles being formed or coated, with an inert carrier such as air or carbon dioxide. Exemplary volatile tertiary amine catalysts which result in a rapid cure at ambient temperature that may be employed in the practice of the present invention include trimethyl-amine, triethylamine and dimethylethylamine and the like.

Exemplary liquid tertiary amines which are basic in nature include those having a $pK_b$ value in a range of from about 4 to about 11. The $pK_b$ value is the negative logarithm of the dissociation constant of the base and is a well-known measure of the basicity of a basic material. The higher the number is, the weaker the base. Bases falling within the mentioned range are generally, organic compounds containing one or more nitrogen atoms. Preferred among such materials are heterocyclic compounds containing at least one nitrogen atom in the ring structure. Specific examples of bases which have a $pK_b$ value within the range mentioned include 4-alkyl-pyridines wherein the alkyl group has from 1 to 4 carbon atoms, isoquinoline, arylpyridines, such as phenyl pyridine, acridine, 2-methoxypyridine, pyridazines, 3-chloropyridine, and quinoline, N-methylimidazole, N-vinylimidazole, 4,4-dipyridine, phenylpropylpyridine, 1-methylbenzimidazole and 1,4-thiazine. Additional exemplary, suitable preferred catalysts include, but are not limited to, tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously mentioned catalyst. Examples of useful metal organic compounds which may be employed as added catalytic materials are cobalt naphthenate, cobalt octate, dibutyltin dilaurate, stannous octate and lead naphthenate and the like. When used in combinations, such catalytic materials, that is the metal organic compounds and the amine catalysts, may be employed in all proportions with each other.

The liquid amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component present in a composition in accordance with the invention.

The curing time can be controlled by varying the amount of liquid catalyst added. In general, as the amount of catalyst is increased, the cure time decreases. Furthermore, curing takes place at ambient temperature without the need for subjecting the compositions to heat, or gassing or the like. However, if desired preheating of the filler may be employed to raise the temperature of the filler to accelerate the reactions and control temperature and thus, provide a substantially uniform operating temperature on a day-to-day basis. The filler may be typically preheated to from about 30° F. up to as high as 120° F. and preferably up to about 75° F. to 100° F. However, such preheating is neither critical nor necessary in carrying out the practice of this invention.

5. Employing the Urethane-Containing Resin to Make or Coat Cores

In general, a process for making cores in accordance with this invention comprises admixing filler with at least a binding amount of the polyhydroxy component. The polyhydroxy component, e.g., resole resin, is dissolved in sufficient solvent to reduce the viscosity of the phenolic resin component to below about 1000 centipoises. This solvent comprises hydrocarbon solvents, polar organic solvents and mixtures thereof. Then, an isocyanate component, having a functionality of two or more, is added and mixing is continued to uniformly blend the filler with the phenolic resin and isocyanate components. A sufficient amount of catalyst is added to substantially and completely catalyze the reaction between the components. The admixture is cured forming the cores.

There is no criticality in the order of mixing the constituents with the filler. On the other hand, the catalyst is typically added to the mixture as the last constituent of the composition so that premature reaction between the components does not take place. As a practical matter, the polyhydroxy component can be stored separately and mixed with solvent just prior to use of or, if desirable, mixed with solvent and stored until ready to use. Such is also true with the isocyanate component. As a practical matter, the polyhydroxy and isocyanate components should not be brought into contact with each other until ready to use to prevent any possible premature reaction between them. The components may be mixed with the filler either simultaneously or one after the other in suitable mixing devices, such as mullers, continuous mixers, ribbon blenders and the like, while continuously stirring the admixture to insure uniform mixing of the components.

When the admixture is to be cured with a gaseous catalyst, the admixture after shaping to form uncured cores is subjected to gassing with vapors of an amine catalyst. Sufficient catalyst is passed through the admixture to provide substantially complete reaction between the components.

When a polyurethane coating on the cores is to be cured with a gaseous catalyst, after the polyhydroxy and polyisocyanate components are coated onto the cores then the gaseous catalyst is applied.

In contrast, liquid catalyst for curing the polyurethane used as a binder for the cores is generally added to the filler material with the phenolic and isocyanate components to form an admixture. The admixture is then shaped into cores and permitted to cure until reaction between the components is substantially complete. On the other hand, the catalyst may also be admixed with either one of the components prior to mixing the filler with the phenolic and isocyanate components.

Liquid catalyst for coating the cores is generally coated onto the cores with the phenolic and isocyanate components. The coatings are then permitted to cure until reaction between the components is substantially complete. On the other hand, the catalyst may also be admixed with the phenolic prior to coating the cores with the isocyanate components.

Figure 7:
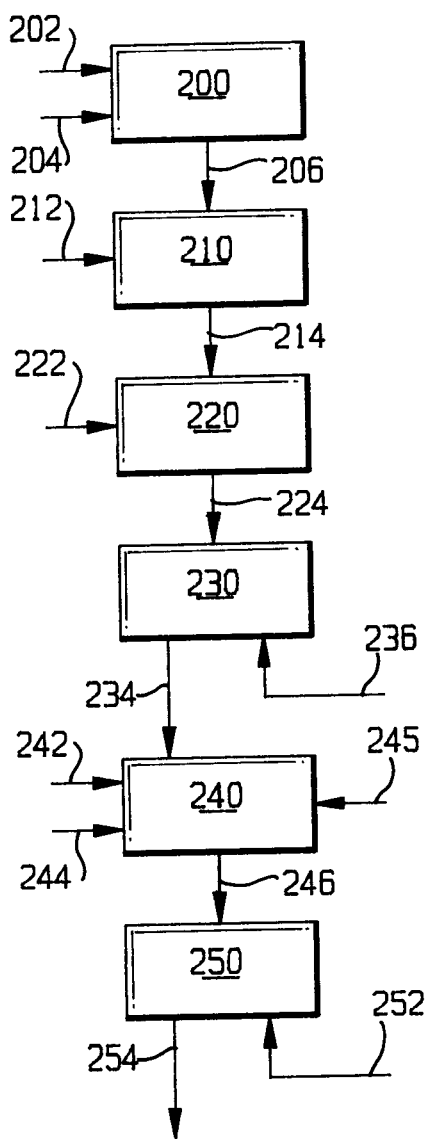
FIG. 7 shows a process flow diagram of a cold set process for making cores and coating cores with polyurethane.

FIG. 7 shows a process flow diagram of a cold set process for making cores and coating cores with polyurethane.

Phenolic component stream 202 and catalyst stream 204 feed a mixer 200 wherein they are mixed to produce a mixture stream 206. The mixture stream 206 and a filler stream 212 feed a pre-mixer 210 operating at 50 to 80 revolutions per minute (rpm) to form a mixed stream 214.

Mixed stream 214 and an isocyanate stream 222 feed an Eirich mixer 220 operating at high speed. The resin cures in the Eirich mixer 220 to form cores of filler and cured resin which discharge as a core stream 224. Optionally, the core stream 224 feeds a fluid bed drier 230. In the fluid bed drier 230 the cores are dried using ambient to 50° C. air from air stream 236 to remove excess solvent and/or assist setting. This produces a stream of dried cores 234. If coated cores are desired, the cores 234 feeds standard foundry mixer 240 operating at 50 to 80 rpm. A phenolic component 242 and catalyst stream 244 and an isocyanate component stream 245 also feed the standard foundry mixer 240, to coat the cores and then cure on the cores. This forms a stream of cured coated cores 246 which feeds an optional fluid bed dryer 250. Dryer 250 dries the cured coated cores using ambient to 50° C. air stream 252 to remove excess solvent. This produces a proppant stream of dried coated cores 254.

If desired, the premixing at 50 to 80 rpm and the high speed mixing may be accomplished in the same Eirich mixer 220 by controlling feed rates and mixing speed. For example, the filler stream 212 and phenolic/catalyst resin stream may be fed to the mixer operating at low speed of 50 to 80 rpm. Then the isocyanate stream 222 would feed the Eirich mixer operating at high speed.

Also, urethane binders typically have a curing exotherm which increases its temperature during curing. This higher temperature increases curing speed. If additional curing is desired, a small amount (less than 3 wt. %) of hot catalyst or hardener may be added during mixing.

5. SIGMA SET Binders

A preferred class of polyurethane binders are SIGMA SET resins. These are phenolic resin dissolved in petroleum solvents which are cross-linkable with a polymeric isocyanate using an amine catalyst. They are available from Borden, Inc., Louisville, Ky. A typical blend for coating composite proppant provides 1000 lbs of cores coated with a 10 weight percent coating of a mixture of 60 pounds of SIGMA CURE MR71, 40 pounds of SIGMA SET 6605 and 2 pounds of SIGMA SET 6710 available from Borden, Inc., Louisville, Ky. Typically, the SIGMA SET 6710 is mixed with SIGMA CURE MR71 before use.

D. Epoxy Resin

Epoxy resins are commercially available and prepared from either glycidyl materials such as the ethers, produced by the reaction of chlorohydrin with a phenol or alcohol, or epoxies, such as the product from the reaction of peracetic acid with a linear or cycloaliphatic olefin. The epoxy resin molecule is characterized by the reactive epoxy or ethoxline groups:

IV

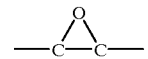

which serve as terminal linear polymerization points. Crosslinking or cure is accomplished through these groups or through hydroxyls or other groups present. The well-known epoxy resins are usually prepared by the base-catalyzed reaction between an epoxide, such as epichlorohydrin and a polyhydroxy compound, such as bisphenol A.

Preferably epoxy resins can be selected from glycidyl ethers made from bisphenol A and epichlorohydrin. These resins are available in liquid form having a typical viscosity of about 200 to about 20,000 centipoises, and an epoxide equivalent weight of about 170 to about 500 and weight average molecular weight of about 350 to about 4000. Typical epoxy resins include ARALDITE 6005 sold by Ciba-Geigy Corporation or EPN 1139 novolac-based epoxy resin such as a liquid epoxy novolac resin manufactured by Ciba-Geigy Corporation. A preferred epoxy resin is Dow DER 331 manufactured by Dow Chemical Company, Midland, Mich. However, solid epoxy resins (solid in the neat state) may be employed if they are soluble in the binder/coating resin system and reactive.

In general, preferred bisphenol A-based epoxy resin for the present invention would have approximately the structure given in Formula V below. These types of resins are commercially available in a range of molecular weights, epoxy equivalents, and viscosities. Typically, these epoxy resins are reaction products of bisphenol A and epichlorohydrin as shown, for example, by Formula V:

V

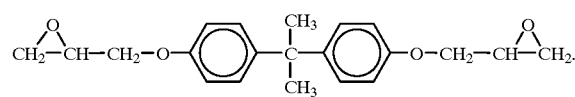

The reaction products polymerize to form resins having the following general Formula VI:

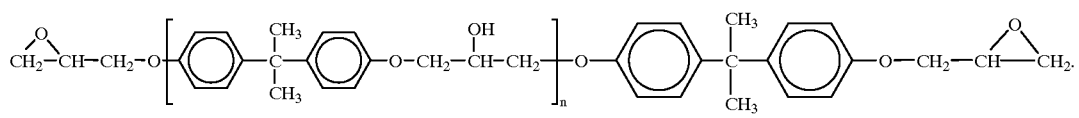

In Formula VI, n is the number of repeating units and may be from 0 to about 15. Although the preferred formulation employs the above type of epoxy, other epoxy resins are useful. These would include any epoxy resins that are at least di-functional and soluble in the resin system. The upper limit of functionality occurs where the epoxy is insoluble, or intractable, in the resin system. The resin system would include the base resin and the solvents and plasticizers the base resin is dissolved into. The two parameters, functionality and solubility, are key to the application for improved resistance to water-based coatings. If an epoxy resin is soluble in the resin system, and if it is "cross-linkable" (minimally di-functional), then the properties disclosed relative to resistance to water-based coatings would be attainable in varying degrees.

The epoxy resin is uncured when added to the binder/coating resin systems of the present invention. The epoxy resin is then cured. Epoxy resins may be cross-linked by various routes, and the resin systems presently disclosed provide several of these routes. Epoxy-epoxy polymerizations initiated by tertiary amines, for example, are well known mechanisms in the field of epoxy chemistry. Such tertiary amines are described above as catalysts for curing polyurethane resins. Epoxy-hydroxyl polymerization may occur if properly catalyzed. Both organic and inorganic bases have been used as catalysts for epoxy-hydroxyl polymerization. A tertiary amine is one such catalyst. It should also be apparent to one skilled in the art that heat will aid the polymerizations discussed herein.

A process for making the composite proppants of the present invention with filler and epoxy resin would be similar to that described above for making composite proppants with filler and polyurethane resin.

Figure 8:
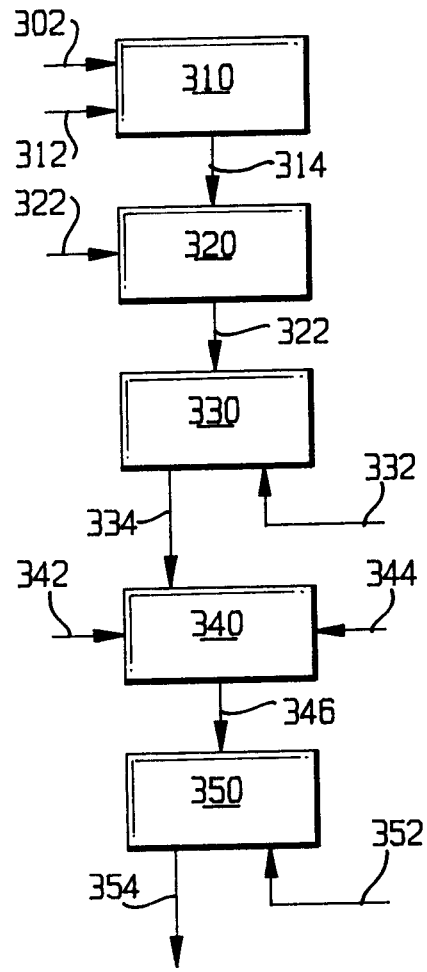
FIG. 8 shows a process flow diagram of a cold set process for making cores and coating cores with an epoxy resin.

FIG. 8 shows a process flow diagram of a cold set process for making cores and coating cores with an epoxy resin.

Epoxy stream 302 and filler stream 312 feed a premixer 310 operating at 50 to 80 revolutions per minute (rpm) to form a mixed stream 314.

Mixed stream 314 and catalyst stream 322 feed an Erich mixer 320 operating at high speed. The resin cures in the Erich mixer 320 to form cores of filler and cured resin which discharge as a core stream 322. Optionally, the core stream 322 feeds a fluid bed drier 330. In the fluid bed drier 330 the cores are dried using ambient to 50° C. air from air stream 336 to remove excess solvent and/or assist setting. This produces a stream of dried cores 334.

If coated cores are desired, the cores 334 feed a standard foundry mixer 340 operating at 50 to 80 rpm. An epoxy stream 342 and a catalyst stream 344 feed the standard foundry mixer 340, to coat the cores and then cure. This forms a stream of cured coated cores 346 which feeds an optional fluid bed dryer 350. Dryer 350 dries the cured coated cores using ambient to 50° C. air stream 352 to remove excess solvent. This produces a proppant stream of dried coated cores 354. If desired, the fluid bed dryer could be omitted or replaced by a rotary dryer or a chamber having an inclined, vibrating perforated plate with hot air in downflow, e.g., a WOLVARINE dryer.

As in the case of the urethanes, the premixing step 310 and high speed mixing can both be performed in the Erich mixer 320 by adjusting its speed.

If coatings are not desired, the coating step in mixer 340 and the drying step in dryer 350 are omitted.

The stream 354 is typically sent to classification to collect proppants having the desired particle size. Particles which are too small may be recycled to the premixer 310. Particles which are too large may be crushed and then recycled to the pre mixer 310.

If desired, epoxy groups may be used to modify other groups such as phenolics to produce an epoxy modified phenolic resin.

E. Furans

Furans employable in the present invention include resins made from urea formaldehyde and furfuryl alcohol; urea formaldehyde, phenol formaldehyde and furfuryl alcohol; phenol formaldehyde and furfuryl alcohol; or formaldehyde and furfuryl alcohol.

Suitable furan resin for use as a binder or coating for the cores of the present invention is disclosed by U.S. Pat. No. 4,694,905 to Armbruster incorporated herein by reference, or other furan resins known in the art.

Accordingly, cores are prepared by mixing uncured thermosetting phenolic resin and uncured thermosetting furan resin or a terpolymer of phenol, furfuryl alcohol and formaldehyde with filler. The filler may be preheated to an operating temperature of from 225°–450° F. The resin is then added while the filler is being mixed to form the cores. As mixing is continued, the resin cures to produce a free flowing product comprised of filler and the cured resin.

The cores may then be coated with the resin by a similar procedure.

Although it is possible to employ furans without the use of a catalyst, it is preferred to use a curing catalyst which is sufficiently non-volatile at the operating temperatures, to accelerate the cure of the resin. The curing catalyst can be incorporated into or premixed with the resin or added to the mixture after the resin has been added. The preferred method is to add it to the mixer after the resin has been added. The advantage of the catalyst is that its use can result in a lower coating temperature and/or faster processing time.

The catalyst can be used as is or dissolved in water or other suitable solvent system depending on the catalyst. A strong acid catalyst must be diluted with water to prevent localized reaction of the catalyst with the resin before the catalyst has had a chance to mix with the resin. Solid catalysts that do not melt below the mixing temperature are preferably used in aqueous solution. Catalyst may also be generated in situ.

Specific catalysts include acids with a pKa of about 4.0 or lower, such as phosphoric, sulfuric, nitric, benzenesulfonic, toluenesulfonic, xylenesulfonic, sulfamic, oxalic, salicylic acid, and the like; water soluble multivalent metal ion salts such as the nitrates or chlorides of metals including Zn, Pb, Ca, Cu, Sn, Al, Fe, Mn, Mg, Cd and Co; and ammonia or amine salts of acids with a pKa of about 4.0 or lower, wherein the salts include the nitrates, chlorides, sulfates, fluorides, and the like. The preferred class of catalyst is the ammonia salts of acids and the preferred catalyst is aqueous ammonium nitrate.

The amount of catalyst used can vary widely depending on the type of catalyst used, type of resin used, mixing temperature and type of mixer. In general, the amount of catalyst solids can range from about 0.2% to 10% based on the weight of the resin.

It is desirable to add a lubricant to the mix at some point after the catalyst is added and before the product "breaks down" into free flowing particles. The lubricant is preferably one that is liquid at the mixing temperature and has a sufficiently high boiling point so that it is not lost during the mixing process. Suitable lubricants include vegetable oil, e.g., soy or corn oil, low vapor pressure lubricating oil, liquid silicone such as Dow Corning Silicone 200, mineral oil, paraffin wax, petrolatum, or the synthetic lubricant ACRAWAX CT (a bis-stearamide of a diamine, available from Glyco Chemicals, Inc., Greenwich, Conn.).

It is also desirable to include a silane additive to ensure good bonding between the resin and the particulate matter. The use of organofunctional silanes as coupling agents to improve interfacial organic-inorganic adhesion is especially preferred.

Figure 9:
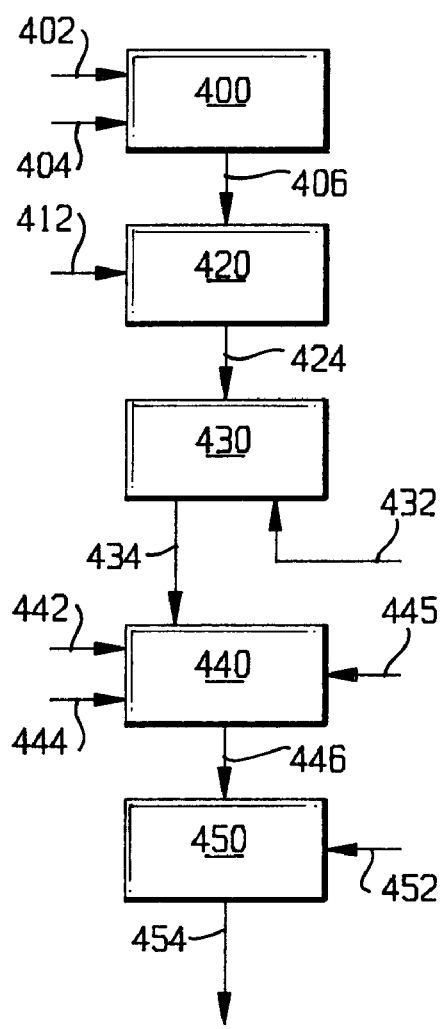
FIG. 9 shows a process flow diagram of a cold set process for making cores and coating cores with a furan resin of formaldehyde and furfuryl alcohol.

FIG. 9 shows a process flow diagram of a cold set process for making cores and coating cores with a furan resin of formaldehyde and furfuryl alcohol.

Filler stream 402 and liquid acid stream 404 feed an Eirich mixer 400 wherein they are mixed to produce a slurry stream 406. The slurry stream 406 and a furan resin (of formaldehyde and furfuryl alcohol) stream 412 feed an Eirich mixer 420 operating at high speed. The resin cures in the Eirich mixer 420 to form cores of filler and cured resin which discharge as a core stream 424. Optionally, the core stream 424 feeds a fluid bed dryer 430. In the fluid bed dryer 430 the cores are dried using ambient to 50° C. air from air stream 432 to remove excess solvent and/or assist setting. This produces a stream of dried cores 434. If desired, an endless belt (not shown) with an overhead heater may be substituted for the fluid bed dryer (430).

If coated cores are desired, the cores 434 feed a standard foundry mixer 440 operating at 50 to 80 rpm. A furan resin (of formaldehyde and furfuryl alcohol) stream 442 and a hydrogen peroxide stream 444 feed the standard foundry mixer 440, to coat the cores. This forms a stream of uncured coated cores 446. The core stream 446 and a gaseous stream of $SO_2$ 452 feed a mixer 450. In the mixer 450 the $SO_2$ and hydrogen peroxide form sulfuric acid in situ and the sulfuric acid cures the resin. This results in a proppant stream 454 of cured coated cores. If desired, proppant stream 454 may feed an optional dryer (not shown) which dries the cured coated cores using ambient to 50° C. air stream to remove excess solvent or to a dryer (not shown) comprising endless belts with an overhead infrared heater. The proppant stream may also be sieved (not shown) to recover the desired size particle with the remainder recycled.

F. Alkaline-modified Resoles Set by Esters

Alkaline-modified resoles settable by esters, e.g., ALPHASET resins available from Borden Inc., Louisville, Ky. are disclosed by U.S. Pat. No. 4,426,467 and Re. 32,812 (which is a reissue of U.S. Pat. No. 4,474,904), all of which are incorporated herein by reference.

Typical alkaline-modified resoles settable by esters comprises an aqueous solution, having a solids content of from 50% to 75% by weight, of a potassium alkali-phenol-formaldehyde resin having the following characteristics:

(a) a weight average molecular weight ($M_w$) of from 700 to 2000;

(b) a formaldehyde:phenol molar ratio of from 1.2:1 to 2.6:1; and (c) a KOH:phenol molar ratio of from 0.5:1 to 1.2:1;

The resins used in this invention are potassium alkaline phenol-formaldehyde resins by which is meant that the alkali in the resin is potassium alkali. This alkali can be present in the resin during manufacture or, more usually, post added to resin as KOH, preferably in aqueous solution of suitable strength. The alkalinity of the resin is expressed in terms of its KOH content and specifically by the molar ratio of KOH to the phenol in the resin.

The molar ratio of KOH:phenol in the resin solution is in the range 0.5:1 to 1.2:1 and preferably 0.6:1 to 1.2:1. At ratios less than 0.5 the speed of cure and product strength are much reduced. The use of KOH:phenol ratios lower than 0.6 is not preferred with resins having $M_w$ (weight average) less than 800 because the speed of cure and product strength is below optimum.

If desired, rather than using only potassium hydroxide as a base, the base may be selected from the group of potassium hydroxide, sodium hydroxide, lithium hydroxide, or mixtures thereof.

The resins used have a formaldehyde to phenol molar ratio of from 1.2:1 to 2.6:1. Especially, within the preferred limits of this ratio suitable highly condensed resins, with low levels of unreacted formaldehyde and high reactivity can be obtained.

The curing catalyst used in the invention is an ester. Suitable esters include low molecular weight lactones, e.g., gamma-butyrolactone, propiolactone, and xi-caprolactone, and esters of short and medium chain, e.g., $C_1$ to $C_{10}$ alkyl mono- or polyhydric alcohols, with short or medium chain, e.g., $C_1$ to $C_{10}$ carboxylic acids especially acetic acid, or triacetin (glyceryl triacetate).

The amount of catalyst used is in the range 20% to 110%, preferably 25% to 40% by weight on the weight of resin solution used, corresponding approximately to 10% to 80% by weight on the weight of solid resin in the solution. The optimum in any particular case will depend on the ester chosen and the properties of the resin.

A silane, typically delta-aminopropyltriethoxy silane, is included in the mixture to improve product strength. Typical amounts range from 0.05% to 3% by weight on the weight of resin solution.

Figure 10:
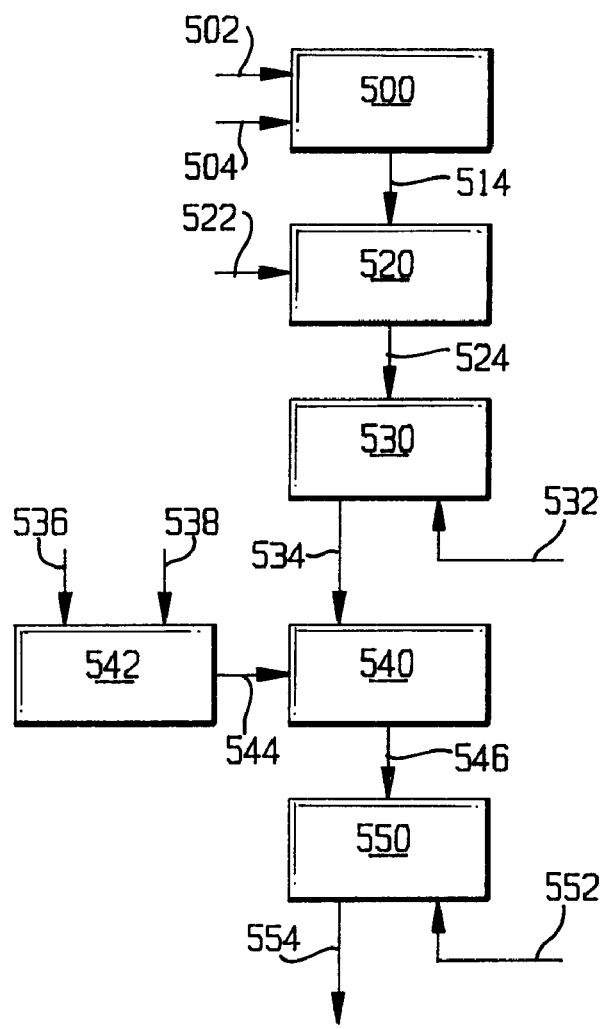
FIG. 10 shows a process flow diagram of a cold set process for making proppant particles of filler and ALPHASET binder and ALPHASET coating.

FIG. 10 shows a process flow diagram of a cold set process for making proppant particles of filler and ALPHASET resin binder and ALPHASET resin coating.

In the process an ester stream 502 and filler stream 504 feed a mixer 500 operating at 50 to 80 revolutions per minute (rpm) wherein they are mixed to produce a mixture stream 514. The mixture stream 514 and an alkaline modified resole resin stream 522 feed an Eirich mixer 520 operating at high speed. (If desired, mixer 500 and mixer 520 may be one Eirich mixer wherein the filler and ester are added at low speed and the alkaline modified resole resin is then added while mixing at high speed.)

The resin cures in the Eirich mixer 520 to form cores of filler and cured resin which discharge as a core stream 524. Optionally, the core stream 524 feeds a fluid bed drier 530. In the fluid bed drier 530 the cores are dried using ambient to 50° C. air (typically 40° C. air) from air stream 532 to remove excess solvent and/or assist setting, i.e., curing. This produces a stream of dried cores 534.

If coated cores are desired, a stream of ester 536 and a stream of alkaline modified resole are fed to a mixer 542 where they are mixed to form a stream 544 of curable resin. Both the stream of the cores 534 and resin 544 feed standard foundry mixer 540 operating at 50 to 80 rpm wherein the resin coats the cores and then cures. This forms a stream of cured coated cores 546 which feeds a fluid bed dryer 550. Dryer 550 dries the cured coated cores using ambient to 50° C. air stream 552 to remove excess solvent. This produces a proppant stream of dried coated cores 554.

If desired, cores 554 are sieved (not shown) to recover the desired size particles with the remainder recycled.

G. Melamine/Formaldehyde Resins

Typically, mixtures of resoles and melamines are heated to effect a melamine formaldehyde reaction to produce a dissolved methylol melamine reaction product (See U.S. Pat. No. 4,960,826). Heat may be applied to thermally set (polymerize) these types of conventional resole resins in curing operations by condensing methylol groups in the resole resins and condensing methoxy methyl groups in the melamine resins. The terms melamine resin is a general term to encompass any melamine-formaldehyde resin with or without other ingredients, e.g., urea groups.

The term "A-stage" resin or dispersion means the resin or dispersion when it is made in solution prior to mixing with a substrate. The term "B-stage" resin or dispersion means the resin or dispersion mixed with substrate.

A typical melamine phenolic resin for use in binding cores or coating cores comprises a liquid alkaline resole resin composition are disclosed by U.S. Pat. Nos. 5,296,584, 5,952,440 and 5,916,966 to Walisser incorporated herein by reference.

The alkaline resole resins employed as part of the present invention may be any of the wide variety of commercially available aqueous or solvent-based phenolic resole resins. Liquid or solid phenolic resole resins, or mixtures thereof, are operative herein, with liquid resins being preferred.

The term "melamine crystal" means melamine, per se, and underivatized in powder, crystalline, or flake form. This shall include, for example, and not by way of limitation, MCI's GP (General Purpose), non-recrystallized grade of melamine powder. Melamine crystal herein shall also mean 1,3,5-triazine-2,4,6-triamine; 2,4,6-triamino-S-triazine; and cyanurotriamide.

A typical melamine resin is provided as a dispersion comprising (i) the reaction product of combining formaldehyde and phenol at a formaldehyde to phenol mole ratio of about 0.5:1 to about 3.5:1 in the presence of a basic catalyst, and (ii) solid melamine crystal dispersed throughout the resin composition. The melamine crystal to phenol mole ratio is from about 0.01:1 to about 1:1. Moreover, the dispersion has a free formaldehyde content of at most about 0.5 weight percent.

Melamine resins, with or without free methylol groups, may be set by heat. Melamine without free methylol have —OR groups rather than —OH groups. Thus, for example, the unreacted, uncured, A-stage melamine dispersions can be mixed with filler to form cores, or coated onto cores, by driving off any liquid carrier such as organic solvent or water, to produce a dry or high solids dispersion in or on the core. The dispersion can then be heat cured during which the melamine is solubilized in the resole, the components react, and crosslinking results in amino methyl linkages.

It has been found advantageous to acidify the dispersions, to a moderately low pH in the range from about 2.5 to about 6 with any suitable acid just prior to mixing with the filler or coating onto the cores. The lower the pH, the more melamine-phenol condensation is achieved as opposed to phenol-phenol or methylol phenol condensation. The very low pH (pH below about 2.0) of acid catalyzed condensations of methylol phenol is avoided.

Strong carboxylic acids, such as oxalic acid, may be employed. Strongly acidic monovalent and low molecular weight acids such as sulfamic, nitric, or methane sulfonic are preferred acids. An acid with a low molecular weight is preferred because of the presence in the resole resins of the present invention of a large amount of alkali. This alkali, used as a catalyst to make the resole resin, requires neutralization. Thus, a low molecular weight acid is preferred to minimize dilution of the final C-stage polymer matrix with non-polymer forming ingredients (acid-base salts) that might otherwise reduce the strength and temperature performance properties of the cured composition. A "latent acid" (a pH neutral substance that chemically reacts, usually with application of heat to form an acidic condition) may also be used. A latent acid such as ammonium sulfate is preferred.

Thus, after the dispersion has been formed by the mixing step, it is converted to a water soluble A-stage, unreacted, uncured but curable binder composition by adding to the dispersion an acid such as oxalic acid, sulfamic acid, nitric acid, or methane sulfonic acid in an amount sufficient to drop the pH to a level of from 2.5 to 6. The temperature when the binder/coating and acid are mixed is not sufficient to dissolve the melamine or to initiate any polymerization between the melamine and the resole. Then the binder and substrate mixture is heated to cure the binder.

The uncured, unreacted resole melamine crystal suspensions, also referred to herein as dispersions, may be applied with any suitably acidic catalyst directly to filler or cores, through, for example, conventional air atomization nozzles or spinning disc atomization equipment. The product of the present invention is particularly suited to higher solid applications in the range of about 10 to about 20 percent where quantities of water needed to effect complete dissolution of the melamine are not available.

A melamine resin made from melamine which contains free methylol groups may be cold set with acid. Typically, the acids are one of the aforementioned acids provided in sufficient quantity to cure the resin without additional heat.

Figure 11:
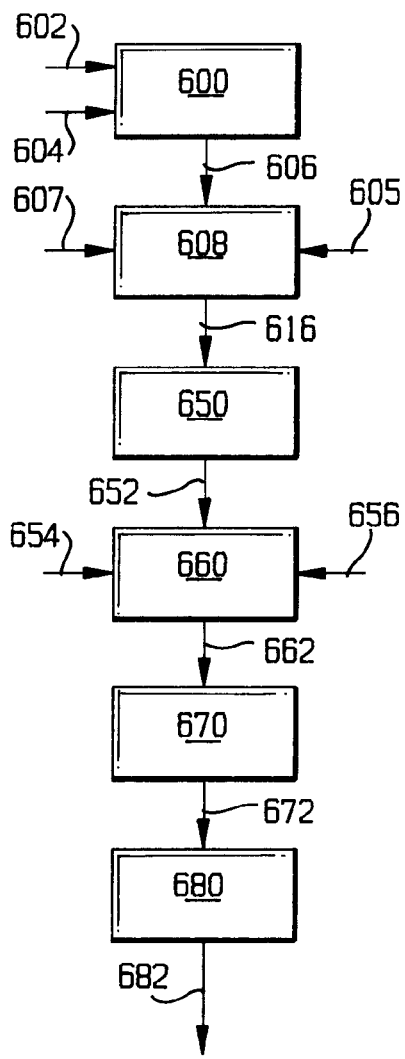
FIG. 11 shows a simplified process flow diagram of a first embodiment of a process for making proppants or filtration media of the present invention with melamine/phenol-formaldehyde as a binder and as a coating.

FIG. 11 shows a simplified process flow diagram of a first embodiment of a process for making proppants or filtration media of the present invention with melamine/phenol-formaldehyde as a binder and as a coating. In the process, a melamine crystal stream 602 and an alkaline resole resin particle stream 604 are fed to a mixer 600 to prepare a homogeneous binder stream 606. The binder stream 606 contains resin, water and conventional additives. Coupling agents are also typical additives. Acid stream 605, binder stream 606 and a filler stream 607 are mixed in a high intensity mixer/granulator 608 to cure the binder and to produce a granulated product stream 616. A typical mixer/granulator 608 is an Eirich R02 mixer manufactured by Eirich Machines, Inc., Gurnee, Ill.

Typically, the mixer/granulator 608 is operated as a batch process as disclosed above.

The amount of binder (resin) generally comprises about 10 to about 30, preferably about 10 to about 25, weight percent of the total dry materials (resin, filler, etc.) fed to the granulator 608. The amount of binder being a water free value defined as the amount of resin and additives other than water. Typically, the mixing occurs in the presence of a coupling agent such as gamma/amino propel trimethoxy silane. The coupling agent may be added to the mixer/granulator 608 before, or premixed with the binder stream 606. Typically, 0 to 50% of the total binder stream 606 is water.

If necessary, the granulated material stream 616 then passes to a curing apparatus 650. Typically, curing apparatus 650 is a drying oven operating at a residence time for the granulated material of about 1 minute to about 2 hours, at a temperature of about 90° to about 200° C., preferably about 150° to about 190° C. This produces a cured granulated product stream 652. These are the proppant cores. These cores may be used as proppant as is, after screening to desired particle size, or may be coated with additional resin.

If it is desired to coat the cores with melamine/resole-formaldehyde binder then the cured core stream 652, a melamine/resole-formaldehyde binder stream 654 and an acid stream 656 feed a mixer 660 to produce a coated binder stream 662. The coated binder stream 662 then feeds an oven 670 operated at conditions as was oven (curing apparatus) 650 to cure the coating and produce a proppant stream 672 of cured coated cores. Alternatively, if cold set resins are employed, the oven may be omitted and the resins may be cold set in the mixer 660. Typical cold set resins may be selected from the group consisting of melamine which contains free methylol groups and for which sufficient acid is provided, or other cold set resins, such as polyurethane.

The cured granulated product stream 672 feeds a screening apparatus 680 to recover a proppant product stream 682 of predetermined product size. A typical screening apparatus 680 is a sieve such as a vibrating screen. A typical desired proppant particle has a $d_{50}$ from 0.4 to 0.8 mm, or a particle diameter range of 20 to 40 mesh (0.425 to 0.85 mm).

H. Urea/Formaldehyde Resins

The urea/formaldehyde resins are employed as a binder or coating by methods similar to those employed for other thermosetting resins. For example, they may be combined with particles to form composite cores and then cured at 150 to 250° C. for 30 to 90 seconds. Likewise, they may be coated onto composite cores and then cured at 150 to 250° C. for 30 to 90 seconds.

The thermosetting urea-formaldehyde (UF) resin can be prepared from urea and formaldehyde monomers or from UF precondensates in manners well known to those skilled in the art. Skilled practitioners recognize that the urea and formaldehyde reactants are commercially available in many forms. Any form which can react with the other reactants and which does not introduce extraneous moieties deleterious to the desired reaction and reaction product can be used in the preparation of urea-formaldehyde resins useful in the invention. One particularly useful class of UF resins for use in preparing binders in accordance with the present invention is disclosed in U.S. Pat. No. 5,362,842, the disclosure of which is incorporated herein by reference.

Formaldehyde for making a suitable UF resin is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde also is available as a gas. Any of these forms is suitable for use in preparing a UF resin in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde adducts, often in aqueous solution. Any form of urea or urea in combination with formaldehyde is suitable for use in the practice of the invention. Both urea prill and combined urea-formaldehyde products are preferred, such as Urea-Formaldehyde Concentrate or UFC 85. These types of products are disclosed in, for example, U.S. Pat. Nos. 5,362,842 and 5,389,716.

Any of the wide variety of procedures used for reacting the principal urea and formaldehyde components to form a UF thermosetting resin composition also can be used, such as staged monomer addition, staged catalyst addition, pH control, amine modification and the like. Generally, the urea and formaldehyde are reacted at a mole ratio of formaldehyde to urea in the range of about 1.1:1 to 4:1, and more often at an F:U mole ratio of between about 2.1:1 to 3.2:1. Generally, the U-F resin is highly water dilutable, if not water soluble.

Many thermosetting urea-formaldehyde resins which may be used in the practice of this invention are commercially available. Urea-formaldehyde resins such as the types sold by Georgia Pacific Resins, Inc. (such as GP-2928 and GP-2980) for glass fiber mat applications, also those sold by Borden Chemical Co., and by Nestle Resins Corporation may be used. These resins are prepared in accordance with the previous teachings and contain reactive methylol groups which upon curing form methylene or ether linkages. Such methylol-containing adducts may include N,N'-dimethylol, dihydroxymethylolethylene; N,N'-bis(methoxymethyl), N,N'-dimethylolpropylene; 5,5-dimethyl-N, N'dimethylolethylene; N,N'-dimethylolethylene; and the like.

Urea-formaldehyde resins useful in the practice of the invention generally contain 45 to 70%, and preferably, 55 to 65% non-volatiles, generally have a viscosity of 50 to 600 cps, preferably 150 to 400 cps, normally exhibit a pH of 7.0 to 9.0, preferably 7.5 to 8.5, and often have a free formaldehyde level of not more than about 3.0%, and a water dilutability of 1:1 to 100:1, preferably 5:1 and above.

The reactants for making the UF resin may also include a small amount of resin modifiers such as ammonia, alkanolamines, or polyamines, such as an alkyl primary diamine, e.g., ethylenediamine (EDA). Additional modifiers, such as melamine, ethylene ureas, and primary, secondary and tertiary amines, for example, dicyanodiamide, can also be incorporated into UF resins used in the invention. Concentrations of these modifiers in the reaction mixture often will vary from 0.05 to 20.0% by weight of the UF resin solids. These types of modifiers promote hydrolysis resistance, polymer flexibility and lower formaldehyde emissions in the cured resin. Further urea additions for purposes of scavenging formaldehyde or as a diluent also may be used.

One example of a cold set process for using UF resin to bind or coat cores would be similar to that of FIG. 9 for furans.

I. Polymer/Cement

A preferred composite particle comprises a polymer, a cement, a high density filler, e.g., a filler having a density of 2.45–3.20 (preferably 2.50–2.80) grams/cm$^3$, a low density 0.507–1.50 grams/cm$^3$ filler, e.g., glass microspheres, fly ash, ground almond shells, ground coconut shells or ground walnut shells, combined in amounts to result in a composite particle having an overall bulk density of 0.50–1.30 grams/cm$^3$ (preferably 0.95–1.10 grams/cm$^3$), as well as a grain density of 0.90–2.20 grams/cm$^3$ (preferably 1.40–1.60 grams/cm$^3$).

One such composite employs a polymer/cement binder composition. In general, polymer/cement compositions may contain at least one member of the group consisting of phenol-aldehyde resin, e.g., uncured resoles or novolacs, melamine-aldehyde resin, urea-aldehyde resin, melamine-urea-aldehyde resin, polyimide resin and polyamide resin. Additives may also be present such as polyamide, glycerol, polyvinylalcohol, plasticizer, adhesion agent, e.g., silanes, and or zinc stearate. Typical polyamides are fatty alcohol soluble polyamides or polyacrylamides.

Hydraulic cement used in the polymer/cement may be conventional cement such as Portland cement (normal Portland cement, high early strength Portland cement or moderate Portland cement, for example), microfine cement (e.g., RHEOCEM 650, microfine Portland cement available from MBT (Australia) Pty. Ltd.), blended cement (Portland blast furnace cement, silica cement or fly-ash cement, for example), lime cement, special cement (high alumina cement or oil well cement, for example) and various gypsum. One or more kinds of hydraulic cement can be used.

The polymer resin that generates water when cured may be suitably formaldehyde resin or polyamide resin. The resin may have a predetermined viscosity adjusted by solvent in view of molding thereafter. It is theorized that water released by the curing of the polymer is advantageously taken up by the cement to help minimize porosity.

Aldehyde polymer/cement resins are composed of a mixture of cement, anhydrous aldehyde resin precursor, organic solution agent and additives. Typical polymer/cement compositions are disclosed by European Patent application No. 0590948 and U.S. Pat. No. 4,003,878 to Smith. Cement with formaldehyde resin precursor or polyamide precursor as disclosed by U.S. Pat. No. 5,651,816 to Kobayashi, et al. Cement with melamine-formaldehyde is disclosed by U.S. Pat. Nos. 4,820,766 to Lahalih, et al and 5,478,391 to Bashlykov, et al, all of which are incorporated herein by reference in their entirety.

The aldehyde resin may be a phenol resin, melamine resin or urea resin, preferably in the form of alcohol solution with a nonvolatile component of 40 to 70%. Alcohol which may be used in this invention is methanol, ethanol, propanol, butanol, cyclohexanol, phenol, cresol, ethylene glycol, trimethylene glycol or the like.

The polyamide resin may be preferably in the form of solution for which a solvent of N-methyl-2-pyrrolidone or N,N-dimethyl acetamide or the like is used with a nonvolatile component of 10 to 30% included therein.

The polymer/cement/filler composite particle has at least one kind of hydraulic cement, a polymer precursor that is substantially anhydrous and generates water by a curing reaction, and the above-described filler. The composition comprises 100 parts by weight powder (powder being cement and filler), 10 to 200 (typically 10 to 100, or 10 to 60, or 12 to 30) parts by we polymer precursor (preferably phenol-formaldehyde polymer resin), 0.1 to 12 parts by weight methanol or ethanol, and 0 to 5 parts by weight other additive, e.g., plasticizer. Of course the relative amounts of cement and polymer must, when combined with filler and optional coating, result in the desired low density composite particle. The polymer may be provided in a molten form or as a solution. The solution agent may be methanol (for phenolic resins) or ethanol.

The hydraulic cement has filler particles added and is employed to make cores of these composite particles. The blend ratio of polymer resin is relative to 100 weight parts of powder components of hydraulic cement having the filler added.

The filler particles are typically present in an amount from about 3 to about 50 weight percent of the core. Typical subranges are about 5 to about 25 weight percent or about 5 to about 15 weight percent of the core. However, sufficient low density filler must be present to achieve composite particles of the desired low density, namely, composite particle bulk density of 0.50 to 1.30 gr/cm$^3$, preferably 0.95 to 1.10 gr/cm$^3$, and composite particle grain density (particle density) of 0.90 to 2.20 gr/cm$^3$, preferably 1.40 to 1.60 gr/cm$^3$.

Additive or filler is blended with composite material of polymer resin and hydraulic cement. Such additive or filler may be blended by a conventional mixer such as an Eirich type mixer or a helical mixer. If the blend ratio of polymer precursor is relatively small, it may be preferably blended by a mixer providing a compression function, shearing function or spatula touching function. Such a mixer may be a kneader, a wet pan mill, a helical rotor, a roller mill, a Banbury type mixer or the like.

Composite material including formaldehyde resin may be heated at a temperature of 100° to 300° C. and preferably at a temperature of 150° to 250° C. Composite material including polyamide precursor may be heated at a temperature of 300° to 500° C. and preferably at a temperature of 350° C. to 450° C. Heating composite material cures polymer precursor and generates water, whereby hydraulic cement hydrates so that the cement product has higher physical strength.

In general, formaldehyde resin is rapidly cured in an acid area of less than pH 7, but it will be able to be fully cured even in an alkali area of more than pH 7 if it is heated at a temperature of 150° C. to 250° C. for a relatively longer time.

It is known that the curing reaction of formaldehyde generates water. The thus generated water hydrates hydraulic cement under heat to produce a cement hydrate.

An example of a typical curing reaction of polyamide precursor that produces polyamide in accordance with an intramolecular cyclodehydration reaction of polyamic acid is as follows:

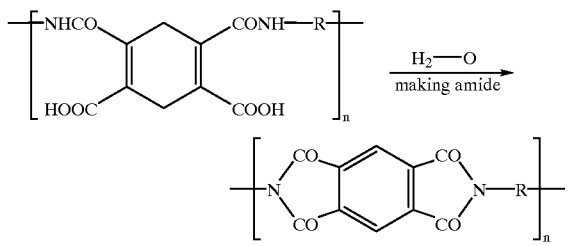

Water generated by imide reaction of polyimide precursor hydrates hydraulic cement under heat in the same manner as water generated by curing reaction of formaldehyde precursor to produce a cement hydrate.

Although the cement of the invention has no water particularly required on kneading, it may be blended with a small quantity of water. Furthermore, there may be added thereto an additive such as glycerol, glycerol triacetate, polyethylene glycol, furfural, dibutyl phthalate, phthalic anhydride, stearic acid, rosin, polyamide, polyacrylamide, polyvinyl alcohol or the like.

Particularly, polyamide, polyacrylamide or polyvinyl alcohol is a preferable additive for improvement of the cement product. The additive may be added directly to the polymer resin and then dissolved or dispersed therein, but it may be dissolved or dispersed in solvent such as ethanol, methanol or N,N-dimethylacetamide and then added to polymer resin.

A blend ratio of the additive may be generally of 0.5 to 20 weight parts to 100 weight parts of polymer resin and preferably 2 to 12 weight parts thereto.

Polyamide used in the invention is preferably alcohol-soluble. Such alcohol-soluble polyamide may be amide bonding CONH having at least a part of hydrogen substituted by methoxymethyl group, or amide bonding CON(R) produced from a secondary amine. Such polyamide added to the polymer precursor reacts with the polymer precursor during heating and curing in the manner corresponding to that in which formaldehyde resin precursor or polyimide precursor reacts through intramolecular cyclodehydration under heat.

Generally, the cement composite material is blended with the filler when kneaded in the percentages listed above.

In order to improve adhesion of filler and/or hydraulic cement to resin, there may be added conventional silane coupling agent thereto. Such silane coupling agent may be gamma-aminopropyl triethoxysilane, gamma-ureidopropyl triethoxysilane or gamma-glycidoxypropyl trimethoxysilane.

Figure 12:
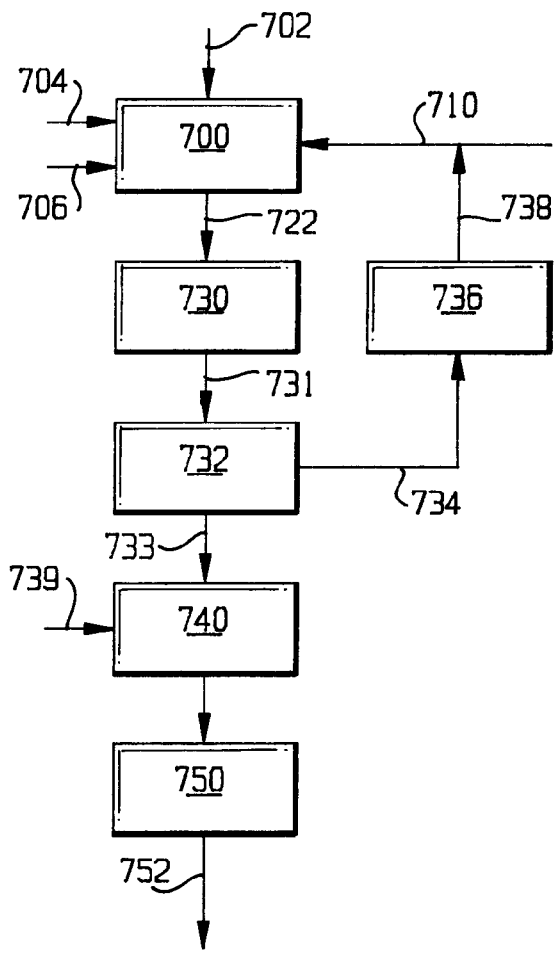
FIG. 12 shows a process for making proppant of the present invention from cement/phenol-formaldehyde polymer compositions.

FIG. 12 shows a process for making proppant of the present invention from cement/phenol-formaldehyde polymer compositions. Alumina cement stream 702, phenol-formaldehyde resin stream 704, additives stream 706, and a filler particle stream 710 feed a high speed Eirich mixer 700 in which the cement/phenol-formaldehyde resole resin and filler are mixed and granulated to form a stream of uncured cores 722. The core stream 722 then passes to a curing apparatus 730 which is a drying oven which heats the cores for an appropriate time to a temperature in the range of from 100° C. to 300° C. This cures the resin and generates water to hydrate the cement so that the cement has higher physical strength. A stream of cured cores 731 is discharged from the oven 730 and passes through an optional screen 732 to produce a stream 733 of screened cured cores of desired size and a stream 734 of cores of undesired size (too large and/or too small, hereinafter termed "off-size cores"). Stream 734 passes into a grinder mill 736 which grinds the off size cores to make material stream 738 which is recycled as filler into filler stream 710.

If it is desired to coat the screened, cured cores 733, then a resole resin stream 739 and core stream 733 feed a mixer 740 to coat the cores which discharge as coated core stream 742. The coated core stream 742 then feeds a drying oven 750 which maintains the coated cores for an appropriate time to a temperature in the range of from 100° C. to 300° C. to cure the coating. The cured coated cores are then discharged as proppant stream 752. The proppants are then screened by a conventional sieve (not shown) to recover proppant particles of desired size. Particles smaller than the desired size may be recycled (not shown) and particles larger than the desired size may be crushed and then recycled (not shown). Of course, in the alternative, a cold set resin could be employed as a coating if desired.

J. Macro Defect Free (MDF) Cement

Another composite particle, which comprises a binder of cement and polymer as well as the filler particles in amounts to achieve the above-described low densities, employs macro defect free (MDF) cement. MDF cement is a cement free from macroscopic defects and is well known in the art. U.S. Pat. No. 4,070,199 describes an hydraulic material having a high flexural strength, prepared by kneading by means of a cylinder mixer a mixture of hydraulic cement, water and a polymer soluble or dispersable in water. The product is then pressed and left to harden. Subsequent patents (EP 55035 and EP 21682) describe other polymeric materials which can be included in cement mixtures, such as hydroxypropylmethylcellulose or partially hydrolized polyvinyl acetate.

The use of fibers in MDF cement matrices is well known in the art. For instance, Italian Patent No. 1,068,427 reports the use of inorganic mineral fibers (asbestos fibers), organic or polymeric fibers (polypropylene or nylon). According to the '427 Patent, after addition of nylon fibers cut in 20 deniers pieces having a constant length equal to 10 mm, the hardened cement matrix shows a high proportional elastic limit, which remains substantially equal even when increasing the quantity of fibers up to 6% by weight.

The term "hydraulic cement" means any material setting and hardening by water addition, and that consequently sets and hardens in the presence of water. The hydraulic cement may be a silicate based cement (siliceous) for instance Portland cement, an aluminate based cement (aluminous), for instance a calcium aluminate based cement, or a mixed cement such as a pozzolan. It is also possible to use mixtures of two or more different hydraulic cements. According to a preferred embodiment of the invention, aluminate based cements or Portland cement is used.

Any aggregate, optionally fly ashes and additives for preparing the mixtures known in the art can be used in the cement material of the invention. However, sufficient low density filler must be present to achieve composite particles of the desired low density, namely, composite particle bulk density of 0.50 to 1.30 $gr/cm^3$, preferably 0.95 to 1.10 $gr/cm^3$, and composite particle grain density (particle density) of 0.90 to 2.20 $gr/cm^3$, preferably 1.40 to 1.60 $gr/cm^3$.

Practically any commercially available can be used in the cement compositions of the invention, such as: Portland cement, Portland-composite cement, blast furnace cement, pozzolanic cement and composite cement. The cement composition of the invention must necessarily comprise an organic polymer soluble or dispersable in water. The polymer is used to give the cement mixture the necessary moldability characteristic of this kind of cement, and to improve its mechanical characteristics.

As far as the present invention is concerned, a wide variety of polymers soluble or dispersable in water which can be used.

Examples of polymers soluble or dispersable in water polymers which can be suitably used are: alkyl and hydroxy-alkyl cellulose ethers (methylcellulose, hydroxyethylcellulose, methylhydroxy ethyl cellulose, ethylhydroxyethylcellulose, propylcellulose, hydroxypropylmethylcellulose, hydroxybutylmethylcellulose) acrylamide polymers or copolymers, (polyacrylamide, polymethacrylamide, acrylamide/methacrylamide copolymer); vinylacetate hydrolizable polymers or copolymers, particularly polyvinylacetate; vinyl alcohol polymers or copolymers; alkylene oxide polymers (polyalkylene glycols having weight average molecular weight above 10,000), or polyalkoxy-derivatives of alcohols and/or phenols.

Every polymer soluble or dispersable in $H_2O$ reported in the European Patent No. 280971 can be used in the present invention. According to EP 280971, organic polymers such as water-soluble polymer or water-dispersable polymers in the form of a polymer emulsion or a polymer latex can be used. EP 280971 reports water-soluble polymers such as water-soluble proteins, water soluble starches, water soluble cellulose derivatives (e.g., hydroxypropylmethyl cellulose), partially hydrolized polyvinyl acetate, polyvinyl alcohol, polyacrylic soda, polyethylene oxide, polyacrylamide, cross-linked acrylic acid polymer, water-soluble urea resin, water-soluble melamine resin, water-soluble epoxy resin, water-soluble polyester, water-soluble phenol-formaldehyde resin, water-soluble amine neutralization alkyd resin, polyvinyl methylether, polyvinylpyrrolidone, polystyrene sulfonic acid, and quaternary polyvinyl pyridine; and water-dispersable polymers such as those in the form of rubber latex, acrylic emulsion, vinyl acetate emulsion, vinyl chloride emulsion, ethylene-vinyl acetate emulsion, polypropylene emulsion, epoxy resin emulsion, polyurethane emulsion, polyamide emulsion, or bituminous emulsion.

The polymer content in the cement mixture can range from about 10 to about 40% by weight of the cores, preferably from 10 and 30% by weight. The water amount, even though it can change as a function of the different kind of polymer, is preferably not greater than 30% by weight with respect to the hydraulic cement amount. Greater water amounts can quickly depress the mechanical characteristics of the final material.

The filler particles may be present in amounts of from about 45 to about 89 weight percent of the cores. Typical filler ranges are from about 50 to 89 or 60 to 89 weight percent of the cores. The cement is present in an amount of about 1 to about 15 weight percent of the cores.

The mixtures useful for the preparation of the MDF cement of the invention have been prepared considering the additional water requirement to process a mixture containing reasonable volumes of filler particles.

In the case of MDF Portland cement or aluminous cement, an increase in water amount of the mixture yields MDF cements having lower mechanical properties (flexural strength about 100 MPa when an aluminous matrix is used). However, such an increase allows mixtures of MDF cement added with fillers to be processed in the presence of high volumes of the latter. Therefore, the effects of various amounts of added water and filler should be balanced to achieve desired results.

Figure 13:
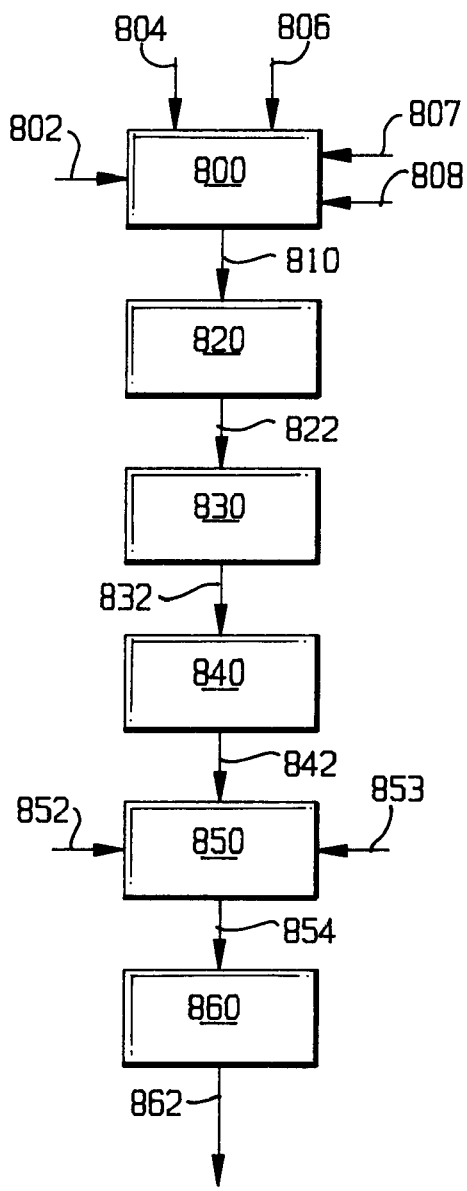
FIG. 13 shows a process for making proppant of the present invention from macro defect free (MDF) cement.

A process for making proppant particles of MDF cement is shown by FIG. 13. In the process, a cement stream 802, a water stream 804, a plasticizer stream 806, a filler stream 807, and a water soluble polymer stream 808 feed a planetary mixer 800 to produce a slurry stream 810. The slurry stream 810 feeds a high shear mixer 820, such as a two roll mill, to produce a stream 822. The stream 822 then undergoes a compaction and homogenization phase in an extruder 830.

The extruder 830 assists in homogenizing the stream 822 ingredients to a uniform density. A stream of chopped extruded pellets 832 is discharged from the extruder 830. If desired, the extruder may be replaced by any device which provides suitable compaction and homogenization to form MDF cement. An example of such devices includes a calendering device (not shown) in which the stream 822 would feed between rolls. The rolls would have surface indentations sized to make and pressurize granules of the stream 822 material.

The pellet stream 832 from the extruder 830 then passes into an oven 840 for curing. Oven 840 typically operates at a temperature of about 50 to 200° C. to produce a stream of cured pellets 842.

If desired, the pellets of stream 842 may be coated by a resin. One way to accomplish this is to feed pellet stream 842, a cold-settable resin stream 852, and a curing agent stream 853 to a mixer 850. This produces a stream of coated pellets 854 which may be fed to an optional dryer 860 to produce a coated proppant stream 862.

K. Employing Both Heat Set and Cold Set Resins

It is not necessary that the polymer in the core be the same as the polymer in the coating. Thus, it is desirable to employ a heat set resin, such as a resole, in the core and a cold set resin, such as a polyurethane, in the coating. This has the advantage of faster processing time than a proppant having heat set resins in both the core and coating.

It is also possible to employ a cold set resin in the core and a heat set resin in the coating, so long as the cold set core can withstand the heat set conditions.

L. Proppant Particle

Figure 5:
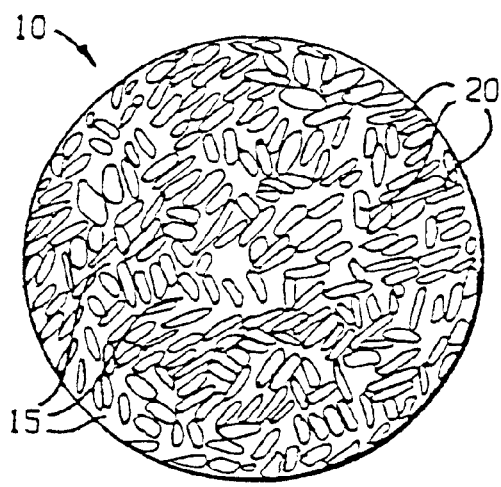
FIG. 5 shows a first embodiment of a particle of proppant or filtration media of the present invention.

FIG. 5 shows a proppant particle 10 comprising filler particles 20, and a resin 15.

Figure 6:
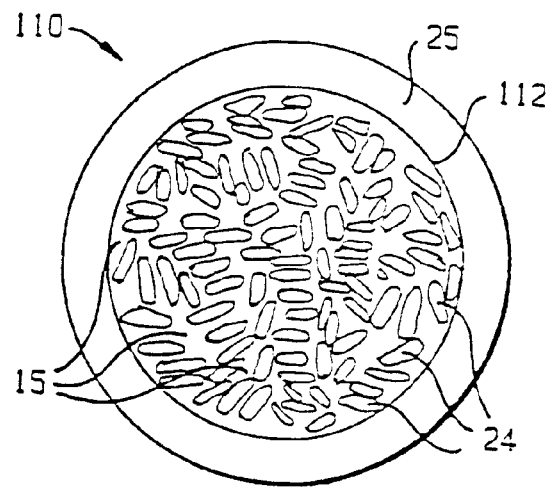
FIG. 6 shows a second embodiment of a particle of proppant or filtration media of the present invention.

FIG. 6 shows a coated proppant particle 110 having a core 112, of resin 15 and filler particles 24, coated by a second resin coating 25.

M. Composite Particle Parameters

The following parameters are useful when characterizing composite proppant particles, composite gravel packing, and composite filtration media particles of the present invention.

The composite particles of the present invention have a density lighter than conventional sand. Sufficient low density filler must be present to achieve composite particles of the desired low density, namely, composite particle bulk density of 0.50 to 1.30 $gr/cm^3$, preferably 0.95 to 1.10 $gr/cm^3$. Typically, the proppant particles have a composite particle bulk density of about 50 to about 80.5 $lbs/ft^3$. Also, the composite particle grain density (particle density) range from 0.90 to 2.20 $gr/cm^3$, preferably 1.40 to 1.60 $gr/cm^3$. They generally have a sphericity of greater than 0.7, preferably greater than 0.85, and more preferably greater than 0.9. Generally, the coating is from 0 to about 10 weight percent of the total weight of the proppant regardless of whether the core binder is a polymer binder or a combination of polymer and cement.

Where the binder is polymer resin or inorganic binder such as phosphate glass, the volume percent filler particles in the coated or uncoated composite particle is 60 to 85%, preferably about 65 to about 85 volume percent, more preferably about 80 to about 85 volume percent; the weight percent filler particles in the composite particles is about 45 to about 90%, typically about 45 to about 80% or about 60 to about 75% or about 70 to about 90%; and the weight percent filler particles in the core of the resin coated composite particle is about 50 to about 90%, typically about 50 to about 80% or about 65 to about 75% or about 80 to about 90%.

Where the binder is polymer/cement the composition comprises 100 parts by weight powder (powder being cement and filler), 10 to 200 (typically 10 to 100, or 10 to 60, or 12 to 30) parts by weight polymer precursor (preferably phenol-formaldehyde polymer resin), 0.1 to 12 parts by weight methanol or ethanol, and 0 to 5 parts by weight other additive, e.g., plasticizer. The filler particles are typically present in an amount from about 3 to about 50 weight percent of the core. Typical subranges are about 5 to about 25 weight percent or about 5 to about 15 weight percent of the core.

Where the binder is MDF cement, the polymer content in the cement mixture can range from about 10 to about 40% by weight of the cores, preferably from 10 and 30% by weight. The water amount, even though it can change as a function of the different kind of polymer, is preferably not greater than 30% by weight with respect to the hydraulic cement amount. Greater water amounts can quickly depress the mechanical characteristics of the final material. The filler particles may be present in amounts of from about 45 to about 89 weight percent of the cores. Typical filler ranges are from about 50 to 89 or 60 to 89 weight percent of the cores. The cement is present in an amount of about 1 to about 15 weight percent of the cores.

In general, a preferred embodiment of the composite particles of the present invention comprise a cement and a polymer as a binder and employ higher density filler particles for strength and lower density filler particles to help achieve the desired low densities described above. The proportions of thse ingredients depends upon the final use of the composite particle. For example the strength requirements for a proppant particle are higher than for gravel packing.

The composite particle $d_{50}$ ranges from about 0.4 to about 0.8 mm. For coated proppant, wherein the first and second portions of binder are polymer, the dry weight ratio of the first portion of binder to the second portion of binder is 70 to 60:30 to 40. The composite particles are within a size range from about 4 to about 100 mesh based on U.S. Standard Sieve Series, typically about 8 to about 60 mesh, preferably a size range of a 20/40 material based on API Method RP 56 Section 4 (0.425 to 0.85 mm).

Crush material <6–8% of precured proppants at 4000 psi closure stress is defined as that measured according to the following procedure. American Petroleum Institute Method RP 56 procedure Section 8.

Dust levels are measured as turbidity by API Method RP 56 Section 7.

Sphericity is determined by API Method 56 Section 5.

Chemical inertness should be comparable to Jordan silica sand (20/40 mesh) with regard to resistance to hydrocarbons and sodium hydroxide solution at pH12. Acid resistance is determined by API Method RP 56 Section 6. The alkali resistance is determined as the resistance to sodium hydroxide solution at pH 12 and 200° F. for 48 hours. The pH to be kept at 12 by addition of caustic as required. The properties and appearance of the proppant should be kept within acceptable limits when exposed to aliphatic or aromatic hydrocarbons.

N. Use of Composite Particles as Proppant or Filtration Media

The composite particles, as described in this invention have special and unique properties such as controlled plasticity and elasticity behavior. Because of these unique properties, the composite particles can be applied as the sole proppant in a 100% proppant pack (in the hydraulic fracture) or as a part replacement of existing commercial available ceramic and/or sand-based proppants, resin-coated and/or uncoated, or as blends between those, e.g., composite particles are 10 to 50 weight % of the proppant injected into the well. The composite particles can also be employed as the sole media in a 100% filtration pack or blended with other filtration media.

When the method of the present invention employs a precured resin composition, the proppant is put into the subterranean formation without a need for additional curing within the formation.

When the method employs a proppant having a curable resin composition, the method may further comprise curing the curable resin composition by exposing the resin composition to sufficient heat and pressure in the subterranean formation to cause crosslinking of the resins and consolidation of the proppant. In some cases an activator can be used to facilitate consolidation of curable proppant. In another embodiment employing a curable resin composition on the proppant, the method further comprises low temperature acid catalyzed curing at temperatures as low as 70° F. An example of low temperature acid catalyzed curing is disclosed by U.S. Pat. No. 4,785,884 incorporated herein by reference in its entirety.

Also, resin-containing particulate material may be used by filling a cylindrical structure with the resin-containing particulate material, i.e., proppant, and inserted into the wellbore. Once in place, the improved properties of this invention are beneficial because the proppant will cure and act as a filter or screen to eliminate the backwards flow of sand, other proppants, or subterranean formation particles. This is a significant advantage to eliminate the back flow of particulates into above ground equipment.

The present composite particles are especially advantageous due to their roundness. This enhances conductivity whether the particles are used alone as a proppant, or together with other proppants, in multi-layer packs. Multi-layer packs by definition are not the partial monolayers used in U.S. Pat. No. 3,659,651. In partial monolayers there are particles in the well that touch the fracture walls, but do not touch each other. In contrast, in multi-layer packs the proppant fills the fractures and production is through the porosity of the proppant.

O. Use of Composite Particles as Gravel Packing

It is known that oil or gas well boreholes are provided with gravel packing about their bore holes. Another aspect of the present invention is that these gravel packs may be provided with the composite particles, or a mixture of gravel and the composite particles, of the present invention. These composite particles would be provided in the standard sizes known for gravel used in gravel packs. The gravel packs may typically comprise from about 5 to about 50 weight percent coated or uncoated composite particles. Gravel packing is applied by as multi-layer packs.

P. Use of Composite Particles in the Sports Field

Artificial turf has been developed to reduce the expenses of maintaining athletic playing areas, and to increase the durability of the turf surface, especially where professional sports are involved.

Artificial turf generally involves a carpet-like pile fabric with a flexible backing laid on a compacted substrate, such as crushed stone or other stabilized base material. The pile fabric has rows of upstanding synthetic ribbons representing glass blades extending upwardly from the top surface of the backing. Of particular interest to the present invention are the various formulations for granular resilient fill that is placed between the upstanding ribbons on the upper surface of the backing to simulate the presence of soil. Most prior art systems involve some use of sand or crushed slag particles, together with a resilient foam backing or crumb rubber particles to provide resilience.

For example, U.S. Pat. No. 3,995,079 to Haas, Jr., incorporated herein by reference, discloses a use of a turf pile fabric for covering a golf green. The infill is a selection from granulated coal slag, crushed flint or crushed granite. A foam resilient underpad provides some resilience, however, the angular particles of the infill are relatively abrasive. Where abrasion is a problem such as games of football, rugby, soccer, field hockey, baseball and other games where players may fall down or be knocked down on the playing surface, there is a need to provide resilient materials which are not abrasive on the granular infill. For example, U.S. Pat. No. 4,337,283 to Haas, Jr., incorporated herein by reference, discloses mixing of fine hard sand particles with 25% to 95% by volume resilient particles to provide an improved resilient and non-abrasive soil imitating infill. Such resilient material may include mixtures of granulated rubber particles, cork polymer beads, foam rubber particles, vermiculite, and the like.

U.S. Pat. No. 5,958,527, incorporated herein by reference, also discloses artificial turf employing a pile fabric with a flexible sheet backing and rows of upstanding synthetic ribbons representing grass blades, extending upwardly from an upper surface of the backing. An infill layer of multiple distinct graded courses of particulate material is disposed interstitially between the upstanding ribbons upon the upper surface of the backing and at a depth less than the length of the ribbons.

If desired, the composite particles of the present invention may be employed for use with artificial turf. Such composite particles are made of filler and a polymer latex synthetic rubber, such as a carboxylated styrene/butadiene copolymer, ethylene propylene diene monomer (EPDM) rubber, or other elastomer. A typical carboxylated styrene/butadiene copolymer is BAYPREN latex, available from Bayer. The composition may further comprise additives such as an emulgator (which is a non-ionic emulsifier), 1–2 weight % anti-oxidant as an anti-aging agent, and 5 to 10 weight % zinc oxide as a strength enhancer. If too elastic, a phenol may be added to modify the latex. The mixture of filler, binder and additives is cured by heat to form particles. The particles are optionally coated. However, uncoated particles are preferred.

These particles may be employed on artificial turf sports fields to provide a safe comfortable playing surface. The particles have a resiliency alone or when mixed with sand to provide the same bounce as a real grass field. This is achieved by balancing the composition and amount of the polymer coated on each core, the weight ratio of coated particles to uncoated sand, and the depth of the layer of coated particles and/or uncoated sand applied to the sports field.

Figure 14:
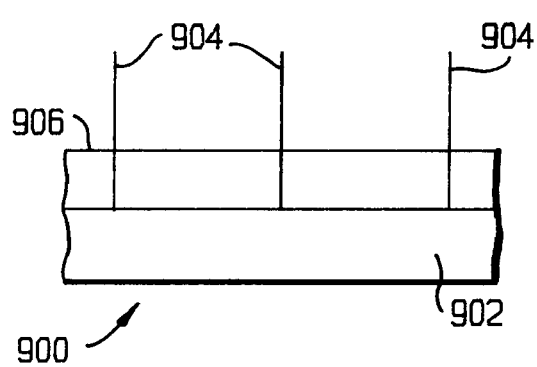
FIG. 14 shows a first embodiment of a sports field employing the particles of the present invention.

FIG. 14 shows a first embodiment of a sports field 900 employing the particles of the present invention. Field 900 comprises a porous rubber mat 902 placed on the ground surface. Blades 904 of artificial grass extend upwardly from the mat 902 and protrude through a layer 906 of latex-filler particles of the present invention. Layer 906 may be 100% latex-filler particles of the present invention which generally fills 10 to 25% of the blade 904 height. Typical composite particles have a size from about 15 to about 70 USS mesh.

Figure 15:
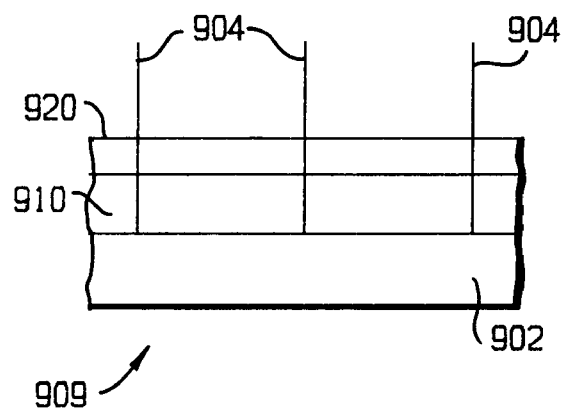
FIG. 15 shows a second embodiment of a portion of a sports field employing the particles of the present invention.

FIG. 15 shows a second embodiment 909 of a portion of a sports field employing the present invention wherein a layer of sand 910 is placed over the mat 902 and a layer 920 of latex-filler particles of the present invention is placed over the layer of sand 910. The combined height of layer 910 and layer 920 generally fills 10 to 25% of the blade 904 height. Typical sand particle size ranges from about 20 to about 50 USS mesh. However, in some instances, such as surfaces for running racehorses, larger sand particles, e.g., as large as about 15 mesh may be employed. Typical composite particles have a size from about 15 to about 70 USS mesh. For example, the weight ratio of the sand to composite particles may range from about 5 to about 95: about 95 to about 5. A typical weight ratio of sand to composite is about 1 to about 3: about 3 to about 1.

For example, a typical artificial grass sports field of the present invention would employ stress relieving composite particles of the present invention packed with sand into a sand pack. Such sports fields are suitable for American football, baseball, European football (Soccer), tennis, golf tee-offs, field hockey, etc.

The present invention solves a problem, common to current artificial grass sports fields, of having insufficient "elasticity" built-in into their sand. Insufficient "elasticity" is a cause of injuries and undesired bouncing of the game ball.

One of the many potential advantages of the present invention is to provide fields with more elasticity, yet also having the ability to relieve stress. This contrasts with current artificial grass sports fields which use particles of shredded tires and, as a result, are too elastic and difficult to stabilize in the sand pack.

A typical composite of the present invention for use in artificial grass sports fields comprises filler particles and a binder of polymer latex. The composite particles may be made by any conventional method for making granules or pellets of latex with filler particles. For example, a mixer/granulator, extruder or other suitable device may be employed. One suitable binder is PERBUNAN X 1120 from BASF-Germany which has ±45% solids and a pH of 7.5. This binder is an aqueous, plasticizer-free dispersion of a butadiene-acrylonitrile copolymer that can be crosslinked by heat. This binder already contains an anionic-nonionic emulsifier and is stabilized with an antioxidant. The heat treatment is generally at temperatures between 120–150° C. and the reaction is accelerated by catalysts, e.g., ammonium nitrate and maleic acid or phosphoric acid. After being completely crosslinked, these binders are insoluble in most organic solvents and water. They might swell but that is an advantage for use in artificial grass sports fields. Possibly the binders may be contacted with extra vulcanization chemicals to improve hardness and strength. It is desirable to employ a strong granulate with partial, yet instant, elasticity under stress and which immediately returns to its pre-stressed shape after the stress is gone. Another desirable feature is to make the composite particles of materials which avoid leaching chemicals which might hurt the players using the sports field. Another embodiment, not shown, mixes the aforementioned sand and composite particles as a single layer. For example, the weight ratio of the sand to composite particles may range from about 5 to about 95: about 95 to about 5. A typical weight ratio of sand to composite is about 1 to about 3: about 3 to about 1.

EXAMPLES 1–12

The invention is explained in more detail in the following, with twelve compositions as example embodiments, and with modifications of the above-described processes of FIGS. 1–3. As stated above, the accompanying drawings show:

FIG. 1: A first embodiment of a process for making composite particles of the present invention.

FIG. 2: A second embodiment of a process for making composite particles of the present invention.

FIG. 3: A third embodiment of a process for making composite particles of the present invention.

Twelve compositions were made to have the compositions listed in TABLE 3. The volume proportions refer to the finally cured "composite proppant" while the weights refer to the composition before granulation. The quartz sand ("Q" indicates quartz) have a $SiO_2$ content >98.3%, fineness of grind, $d_{50}$=6 μm and density of 2.63 g/cm$^3$. The aluminum oxide (indicated by "A") has ≧99% $Al_2O_3$, fineness of grind, $d_{50}$=7.5 μm, and density of 3.96 g/cm$^3$ A fluid phenol-formaldehyde resole resin (symbolized by "P") and a viscous resole resin (indicated by "F") were used as the synthetic resins, with water as the solvent. The phenol-formaldehyde resoles, used in this process have a ratio between phenol:formaldehyde of 1:1.1 to 1:1.9. Typical ratios are around 1:1.2 to 1.5. The fineness of the quartz sand and other fillers also can be used in the range $d_{50}$=3–45 μm.

TABLE 3

| Example No. | Mineral | | Synthetic resin | | Solvent |
|---|---|---|---|---|---|
| 1 | 860 g | 65% Q v/v | 215 g | 35% P v/v | 20 g |
| 2 | 927 g | 70% Q v/v | 185 g | 30% P v/v | 18 g |
| 3 | 993 g | 75% Q v/v | 155 g | 25% P v/v | 15 g |
| 4 | 1267 g | 65% A v/v | 215 g | 35% P v/v | 20 g |
| 5 | 1365 g | 70% A v/v | 185 g | 30% P v/v | 18 g |
| 6 | 1492 g | 75% A v/v | 155 g | 25% P v/v | 15 g |

Use of resole resin F at the same proportions of Examples 1–6 gives the compositions of Examples 7–12, respectively.

These compositions were first compressed at 53 Mpa into test bars with dimensions 5×5×56 mm and put in a dry box at 160 to 240° C. and cured for ten minutes. In view of the ability to granulate, the compositions with 65% by volume mineral, which generally had the highest bending resistance, were preferred for processing into proppant granulations with grain sizes from about 0.4 mm to about 0.8 mm, (20/40 mesh size) according to the process of FIG. 1.

EXAMPLES 13–18

Particles dried at 80° C., in accordance with the process of FIG. 2, but not cured, were subjected to mechanical refining of the surface to smooth it and make it approximate a spherical shape. That was done either by putting the granules in a granulating pan with a high tilt angle and high rotational speed, or by processing them in a SPHERONIZER device at 400–1000 rpm for 3–30 minutes. The smoothing occurred by a removal process (grinding process) in which the particles in a profiled rotating pan were thrown out against a cylindrical wall and then rolled back onto the plate.

According to the process of FIG. 3, the finished cured particles were formed using about 70% by weight of their final synthetic resin content and then were surface-coated with the remaining 30% by weight of the synthetic resin on a rotating disk.

The individual particles listed in TABLE 4, serially numbered, were produced and examined to determine their principal parameters, such as density, sphericity and Brinell hardness:

Example No. 13, composition of Example 1, made according to the process of FIG. 1.

Example No. 14, composition of Example 1, made according to the process of FIG. 2, with later smoothing in a SPHERONIZER device.

Example No. 15, composition of Example 1, made according to the process of FIG. 3, with second curing in a dry box.

Example No. 16, composition of Example 1, made according to the process of FIG. 3, with second curing in a rotary kiln.

Example No. 17, composition of Example 7, made according to the process of FIG. 1.

TABLE 4

| Example No. | Bulk density (g/cm³) | Grain density (g/cm³) | Sphericity | Brinell hardness (Mpa) |
|---|---|---|---|---|
| 13 | 1.12 | 1.87 | 0.82 | 123.7 |
| 14 | 1.19 | 1.98 | 0.84 | 102.3 |
| 15 | 1.29 | 2.15 | 0.92 | 151.0 |
| 16 | 1.14 | 1.90 | 0.92 | 129.0 |
| 17 | 1.12 | 1.87 | >0.8 | <100.0 |

Of these Examples, Example 15 was found to be particularly promising for the intended use, and its characteristics were studied in more detail. The following data of TABLE 5 were found for the effect of the curing temperature, with a curing time of 30 minutes, on the bending strength of test pieces of Example No. 15. They also allow conclusions about other strength characteristics:

TABLE 5

| Curing Temperature | Flexural Strength |
|---|---|
| 160° C. | 89 Mpa |
| 180° C. | 72 Mpa |
| 200° C. | 81 Mpa |
| 220° C. | 80 Mpa |
| 240° C. | 72 Mpa |
| 260° C. | 26 Mpa |
| 280° C. | 22 Mpa |
| 300° C. | 22 Mpa |

A crush test according to API RP 56/60, modified as follows, was also done on a sample of Example No. 15 cured for 30 minutes at 180° C.:

a) Fill a crush cell 31 mm in diameter with granulation to a height of 10 mm.

b) Increase the compressive load in steps to about 100 Mpa (14,500 psi), recording the deformation of the granulate pack at two test temperatures, 20° C. and 125° C.

The results are shown in TABLE 6:

TABLE 6

| Pressure (Mpa) | Pressure (psi) | Deformation (mm) @ 20° C. | Deformation (mm) @ 125° C. |
|---|---|---|---|
| 0.29 | 42 | | 0.06 |
| 0.54 | 78 | 0.08 | |
| 0.60 | 87 | | 0.10 |
| 1.16 | 168 | | 0.16 |
| 1.23 | 178 | 0.13 | |
| 2.90 | 420 | | 0.27 |
| 3.10 | 449 | 0.23 | |
| 5.92 | 858 | | 0.40 |
| 6.29 | 912 | 0.34 | |
| 12.00 | 1739 | | 0.65 |
| 12.60 | 1826 | 0.50 | |
| 24.25 | 3514 | | 0.95 |
| 25.19 | 3651 | 0.77 | |
| 36.57 | 5300 | | 1.36 |
| 37.69 | 5462 | 1.03 | |
| 49.10 | 7116 | | 1.80 |
| 50.15 | 7268 | 1.31 | |
| 61.48 | 8910 | | 2.21 |
| 61.98 | 8983 | 1.60 | |
| 74.33 | 10772 | | 2.55 |
| 75.77 | 10981 | 1.90 | |
| 87.27 | 12648 | | 2.83 |
| 88.58 | 12838 | 2.18 | |
| 98.12 | 14220 | | 3.01 |
| 99.30 | 14391 | 2.37 | |

The following values of TABLES 7 and 8 were also determined for the same sample:

TABLE 7

| Breaking strength in the composite proppant stackpack | |
|---|---|
| 52 Mpa | 0.99% by weight breakage |
| 69 Mpa | 2.39% by weight breakage |
| 86 Mpa | 4.18% by weight breakage |
| 103 Mpa | 7.10% by weight breakage |

TABLE 8

Particle size distribution

| Screen mesh width in mm | Retained, % by weight | Cumulative, % by weight |
|---|---|---|
| 1.0 | 0.0 | 100.00 |
| 0.8 | 1.32 | 98.68 |
| 0.71 | 4.62 | 94.06 |
| 0.63 | 15.47 | 78.59 |
| 0.50 | 48.15 | 30.44 |
| 0.40 | 27.06 | 3.38 |
| 0.25 | 3.88 | 0.00 |
| <0.25 | 0.0 | — |

The acid solubility of this Example No. 15, by API RP 56/60, was 4.4% by weight.

EXAMPLES 18–20

TABLES 9 and 10 show recommended parameter values and actual parameters of Examples 19–21 made by a process of FIG. 3.

TABLE 9

| Property Measured | Recommended Limits | Example 18 | Example 19 | Example 20 |
|---|---|---|---|---|
| API Mesh Size Nominal | 20/40 | 20/40 | 20/40 | 20/40 |
| Resis Content, loss on ignition (LOI), weight % | — | 14.6 | 16.7 | 15.5 |
| Curable Resin Content, % of LOI | — | 0.2 | 0.4 | — |
| Particle Size Distribution | | weight % retained | | |

| U.S. Standard Sieve No. (mm) | | | Example 19A "as is" | Example 19B "resieved" | |
|---|---|---|---|---|---|
| 16 (1.19) | <0.1 | 0.0 | 0.0 | 0.0 | — |
| 18 (1.00) | — | — | — | — | 0.0 |
| 20 (0.84) | — | 0.0 | 0.0 | 0.0 | — |
| −23 (0.80) | — | — | — | — | 1.3 |
| 25 (0.71) | — | 13.5 | 1.3 | 1.5 | 4.6 |
| −28 (0.63) | — | — | — | — | 15.5 |
| 30 (0.589) | — | 41.0 | 16.7 | 18.7 | — |
| 35 (0.50) | — | 26.0 | 29.4 | 33.0 | 48.2 |
| 40 (0.42) | — | 14.6 | 41.8 | 46.8 | — |
| −42 (0.40) | — | — | — | — | 27.0 |
| 50 (0.297) | — | 4.8 | 10.7 | 0.0 | — |
| 60 (0.25) | — | — | — | — | 3.4 |
| pan (<0.297 or <0.25) | <1.0 | 0.1 | 0.1 | 0.0 | 0.0 |
| TOTAL | 100.0 ± 0.5 | 100.0 | 100.0 | 100.0 | 100.0 |
| in-size, −20 + 40 mesh, (0.84–0.42 mm) | ≧90.0 | 95.1 | 89.2 | 100.0 | 95.3 |
| mean particle diameter, inch (mm) | — | 0.023 (0.59) | 0.020 (0.50) | 0.021 (0.52) | — |
| Turbidity, NTU (FTU) | ≦500 | 60 | 80 | — | — |

TABLE 10

| Property Measured | Recommended Limits | Example 18 | Example 19 | Example 20 |
|---|---|---|---|---|
| Crush Resistance @ Closure Stress, psi (Mpa) | | weight % fines generated | | |
| 15,000 (103) | ≦10 | 5.4 | 12.8 | 7.1 |
| 12,500 (86) | | 3.4 | 8.5 | 4.2 |
| 10,000 (69) | | 1.9 | 5.5 | 2.4 |
| 7,500 (52) | | 0.9 | 3.6 | 1.0 |
| 6,000 (41) | | — | 2.6 | — |
| 5,000 (36) | | — | 2.2 | — |
| 4,000 (28) | ≦4 | — | 2.0 | — |
| 3,000 (21) | | — | 1.8 | — |
| 2,000 (14) | | — | 1.6 | — |
| Krumbein Shape Factor roundness | ≧0.9 | 0.8 | 0.7 | 0.9 |
| sphericity | ≧0.9 | 0.8 | 0.8 | 0.8 |
| Acid Solubility, weight % | ≦1.0 | 4.4 | 0.27 | ≦1 |
| Cluster, weight % | ≦1.0 | 1.1 | 1.5 | 5 |
| Density, Bulk, g/cm³ (lb$_m$/ft³) | ≦1.3 (81) | 1.29 (80.5) | 1.21 (75.5) | 1.22 (76.2) |
| Density, Absolute (particle), g/cm³ (lb$_m$/gal) | ≦ about 2.20 (18.5) | 2.22 (18.5) | 2.13 (17.8) | 2.10 (17.5) |
| Crush Resistance** @ Closure Stress 10,000 psi (69 Mpa) | 55 | weight % fines generated —6.2 | | |

**Aromatic Solvent Effects: 20° F. (93° C.), 96 hr. aromatic solvent ND.

TABLE 11 shows conductivity and permeability data. TABLE 12 lists test procedures for properties listed for proppant of various examples.

TABLE 11

Short-term Conductivity & Permeability of Example 20 Proppants

| 200° F. (93° C.) deionized water between stainless steel shims Closure Stress, psi (Mpa) | Example 19A sample "as is" | Example 19B excluding >40 particles |
|---|---|---|
| | Conductivity, md-ft (Permeability, darcy) | |
| 2,000 (14) | 3251 (143) | 4209 (181) |
| 4,000 (28) | 1080 (53) | 960 (47) |
| 6,000 (41) | 216 (11) | 253 (13) |
| 8,000 (56) | 80 (4) | 88 (5) |

TABLE 12

| Property Measured | Procedure |
|---|---|
| Acid Solubility | API RP-56, section 6 |
| Density, Absolute (Particle) | API RP-60, section 8 |
| Density, Bulk | API RP-60, section 8 |
| Clusters (agglomeration) | API RP-56, section 5.5 |
| Crush Resistance | API RP-56/60, section 8/7 |
| Particle Size Distribution | API RP-56/60, section 4, |
| Short-term Conductivity | API RP-61 |
| Turbidity | API RP-56, section 7, Method 1, modified |

While specific embodiments of the composition and method aspects of the invention have been shown and described, it should be apparent that many modifications can be made thereto without departing from the spirit and scope of the invention. Accordingly, the invention is not limited by the foregoing description, but is only limited by the scope of the claims appended thereto.

What is claimed is:

1. A composite particle comprising:
a substantially homogeneous formed particle comprising:
a first portion of a binder, wherein the first portion is at least partly cured;
filler particles dispersed throughout the first portion of binder, wherein particle size of the filler particles ranges from about 0.5 to about 60 μm; and
an optional second portion of a binder coating the formed particle;
wherein the first and second portions of binder have an absence of cement;
wherein at least one member of the group consisting of the first portion of binder or the second portion of binder comprises a cold-set resin,
wherein the composite particle has a bulk density of 0.50 to 1.30 grams per cubic centimeter.

2. The composite particle of claim 1, wherein the composite particle bulk density ranges from about 50 to about 80.5 lbs/ft³.

3. The composite particle of claim 1, wherein 60 to 85 volume percent of the composite particle is the filler particles.

4. The composite particle of claim 1, wherein 60 to 80 volume percent of the composite particle is the filler particles.

5. The composite particle of claim 1, wherein 60 to 75 volume percent of the composite particle is the filler particles.

6. The composite particle of claim 1, wherein the composite particle has a sphericity of at least about 0.7.

7. The composite particle of claim 1, wherein the composite particle has a grain density of 0.90 to 2.20 gm/cm³.

8. The composite particle of claim 1, wherein the composite particle has a grain density of 1.40 to 1.60 gm/cm³.

9. The composite particle of claim 1, wherein the filler comprises at least one member selected from the group consisting of finely divided minerals, fibers, ground almond shells, ground walnut shells, and ground coconut shells.

10. The composite particle of claim 1, wherein the filler particles comprise at least one member selected from the group consisting of fly ash, hollow glass microspheres, ground almond shells, ground coconut shells and ground walnut shells.

11. The composite particle of claim 1, wherein at least one member of the group consisting of the first portion of binder or the second portion of binder comprises at least one member of the group consisting of novolac resin, resole resin, and further comprises cross-linking agents and conventional additives.

12. The composite particle of claim 1, wherein at least one member of the group consisting of the first portion of binder or the second portion of binder comprises at least one member of the group consisting of epoxy resin, polyurethane resin, alkaline modified phenolic resole curable with ester, melamine resin, urea-aldehyde resin, urea-phenol-aldehyde resin, furans, synthetic rubber, polyester resin, and further comprises cross-linking agents and conventional additives.

13. The composite binder of claim 1, wherein each portion of binder comprises at least one polymerized monomer or oligomer selected from the group consisting of melamine, urea, formaldehyde, phenol, bisphenol, isocyanate, epoxy resin, epichlorohydrin, and furfuryl alcohol.

14. The composite particle of claim 1, wherein at least one said portion of the binder comprises inorganic binder or alkoxy modified resole resin.

15. The composite particle of claim 1, wherein the composite particles have diameters from 4 to 100 mesh.

16. The composite particle according to claim 1, wherein the composite particles have diameters between 20 and 40 mesh and comprise a coating of a layer of synthetic resin.

17. The composite particle according to claim 1, wherein the composite particles have diameters between 30 and 40 mesh and comprise a coating of a layer of synthetic resin.

18. The composite particle according to claim 1, wherein the composite particles have diameters between 8 and 20 mesh and comprise a coating of a layer of synthetic resin.

19. The composite particle of claim 1, wherein the first portion of binder comprises a cured binder, and the second portion of binder comprises a curable binder.

20. The composite particle of claim 1, wherein the filler particles have a grain size, $d_{50}$, of 4 to 10 μm.

21. The composite particle of claim 1, wherein the filler particles are about 45 to 80% by weight of the composite particle.

22. The composite particle of claim 1, wherein the filler particles are about 60 to 75% by weight of the composite particle.

23. The composite particle of claim 1, wherein the filler particles are about 70 to 80% by weight of the composite particle.

24. A method for producing a composite particle according to claim 1, comprising mixing the filler particles, the first portion of binder, at least one member of the group consisting of water and an organic solvent, and optional additives to form a mixture and to adjust agglomeration behavior of the filler particles; subjecting the mixture to agglomerative granulation to form cores; and curing the first portion of binder.

25. The method according to claim 24, wherein the curing of the first and second portions of binder is a cold set curing.

26. The method according to claim 24, further comprising coating the cores with said second portion of binder and curing said coating by a cold set curing.

27. The method according to claim 25, wherein the agglomerative granulating is done by extrusion as strands, cutting the strands into fragments, and shaping the fragments under the influence of centrifugal force into spherical granules.

28. The method according to claim 25, wherein the formed particles are smoothed and compressed by rolling before crosslinking of the binder.

29. The method according to claim 25, wherein after the first portion of binder has cured, the formed particles are coated with the second portion of binder and cured again.

30. The method according to claim 25, wherein after granulation the solvent is dried, and after the drying but, before curing the first portion of binder, the formed particles are coated with resin.

31. A method of treating a hydraulically induced fracture in a subterranean formation surrounding a wellbore comprising introducing a proppant comprising composite particles of claim 1 into the fracture.

32. The method according to claim 31, wherein a multi-layer pack comprising the composite particles is formed in the formation.

33. The method according to claim 31, wherein the first portion of binder comprises a resole resin and the second portion of binder comprises a polyurethane resin or an alkaline modified resole curable with ester.

34. The method of claim 31, wherein the proppant further comprises particles selected from at least one member of the group consisting of sand, sintered ceramic particles and glass beads.

35. The method of claim 31, wherein the filler particles have a grain size, $d_{50}$, of 4 to 10 $\mu$m.

36. A method for water filtration comprising passing water through a filtration pack comprising the composite particles of claim 1.

37. A method for forming a gravel pack about a wellbore comprising introducing the composite particles of claim 1 and gravel into the well bore.

38. An artificial turf sports field, comprising a porous mat and a layer comprising the particles of claim 1 over the mat, wherein the first and optional second portions of binder comprise an elastomer.

39. An artificial turf sports field, comprising a porous mat and a layer of the particles of claim 1 over the mat, wherein the binder comprises an elastomer.

40. A method for preparing an artificial turf sports field comprising providing a porous mat and applying a layer comprising the composite particles of claim 1 over the mat, wherein the first portion of binder comprises an elastomer.

41. The method for preparing an artificial turf sports field of claim 40, wherein the second portion of binder comprises an elastomer.

42. The method for preparing an artificial turf sports field of claim 40, wherein a mixture of sand and the composite particles is applied to the mat to form the layer.

43. The method for preparing an artificial turf sports field of claim 40, wherein only the composite particles are applied to the mat to form the layer.

44. A composite particle comprising:
   a substantially homogeneous formed particle comprising:
   a core comprising a binder and filler particles dispersed throughout the binder,
   wherein particle size of the filler particles ranges from about 0.5 to about 60 $\mu$m;
   wherein the composite particle has a bulk density of 0.50 to 1.30 grams per cubic centimeter, and a grain density of 0.90 to about 2.2 gr/cm$^3$;
   optionally the particle has a resin coating.

45. The composite particle of claim 44, wherein the resin coating comprises a cold-set resin.

46. The composite particle according to claim 44, wherein the binder comprises a cement/phenolic polymer composition, a cement/polyamide composition or a cement/polyimide composition.

47. The composite particle according to claim 44, wherein the binder comprises an MDF cement.

48. The composite particle according to claim 44, wherein the binder comprises a cement and a polymer.

49. The composite particle according to claim 44, wherein the binder comprises a cement and a polymer, and the filler particles comprise particles having a grain density of 2.45 to 3.20 gr/cm$^3$ and particles selected from at least one member of the group consisting of glass microspheres, fly ash, ground almond shells, ground coconut shells, and ground walnut shells.

50. A method for producing a composite particle according to claim 44, comprising mixing the filler particles, the first portion of binder, at least one member of the group consisting of water and an organic solvent, and optional additives to form a mixture and to adjust agglomeration behavior of the filler particles; subjecting the mixture to agglomerative granulation to form cores; and curing the first portion of binder.

51. A method of treating a hydraulically induced fracture in a subterranean formation surrounding a wellbore comprising introducing composite particles of claim 44 into the fracture.

52. A method for water filtration comprising passing water through a filtration pack comprising the composite particles of claim 44.

53. A method for forming a gravel pack about a wellbore comprising introducing the composite particles of claim 44 and gravel into the well bore.

* * * * *